(12) United States Patent
Suzuki et al.

(10) Patent No.: US 7,216,480 B2
(45) Date of Patent: May 15, 2007

(54) EXHAUST EMISSION CONTROL SYSTEM

(75) Inventors: Makoto Suzuki, Mishima (JP);
Kunihiko Hayashi, Ashigarakami-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 182 days.

(21) Appl. No.: 10/758,014

(22) Filed: Jan. 16, 2004

(65) Prior Publication Data

US 2004/0144080 A1 Jul. 29, 2004

(30) Foreign Application Priority Data

Jan. 23, 2003 (JP) ............... 2003-015370
Jun. 26, 2003 (JP) ............... 2003-182952

(51) Int. Cl.
*F01N 3/00* (2006.01)

(52) U.S. Cl. .............. 60/285; 60/276; 60/284; 60/286

(58) Field of Classification Search .......... 60/274, 60/276, 284, 285, 286, 287, 277; 123/90.15, 123/565; 165/43
See application file for complete search history.

(56) References Cited

U.S. PATENT DOCUMENTS

| 4,531,379 | A | * | 7/1985 | Diefenthaler, Jr. ........... 165/43 |
| 4,611,466 | A | | 9/1986 | Keedy |
| 4,682,649 | A | * | 7/1987 | Greer ........................... 165/43 |
| 4,935,689 | A | * | 6/1990 | Fujikawa et al. ............... 322/1 |
| 5,177,978 | A | * | 1/1993 | Brown ......................... 62/236 |
| 5,456,240 | A | * | 10/1995 | Kanesaka ................... 123/565 |
| 5,528,901 | A | * | 6/1996 | Willis ......................... 60/626 |
| 5,937,638 | A | * | 8/1999 | Akazaki et al. ............... 60/274 |
| 5,964,088 | A | * | 10/1999 | Kinugasa et al. ............. 60/286 |
| 6,345,496 | B1 | * | 2/2002 | Fuwa et al. ................... 60/274 |
| 2006/0174609 | A1 | * | 8/2006 | Heath .......................... 60/289 |

FOREIGN PATENT DOCUMENTS

| DE | 199 53 940 A1 | 5/2000 |
| EP | 0 796 983 A1 | 9/1997 |
| JP | A 6-93855 | 4/1994 |
| JP | A-08-004522 | 1/1996 |
| JP | A 11-294177 | 10/1999 |
| JP | A 2000-345874 | 12/2000 |
| WO | WO 97/17532 A1 | 5/1997 |

* cited by examiner

*Primary Examiner*—Tu M. Nguyen
(74) *Attorney, Agent, or Firm*—Oliff & Berridge, PLC

(57) ABSTRACT

An exhaust emission control system for a vehicle including a primary engine and a secondary engine having a displacement smaller than that of the primary engine is provided with an exhaust passage having a junction portion at which exhaust gas discharged from the primary engine and exhaust gas discharged from the secondary engine join together, and an exhaust emission purifying device that purifies the exhaust gas joined at the junction portion in the exhaust passage.

6 Claims, 18 Drawing Sheets

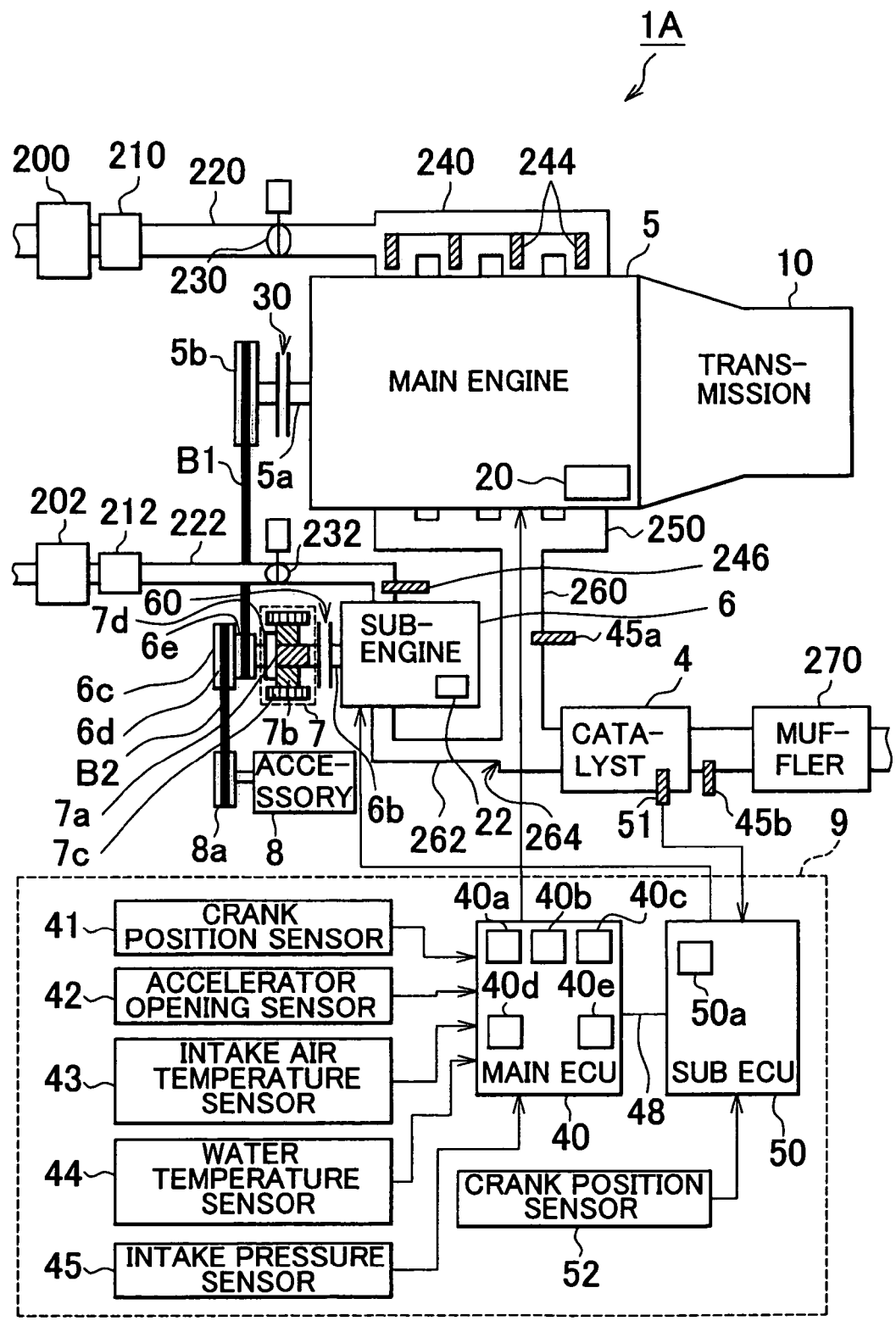

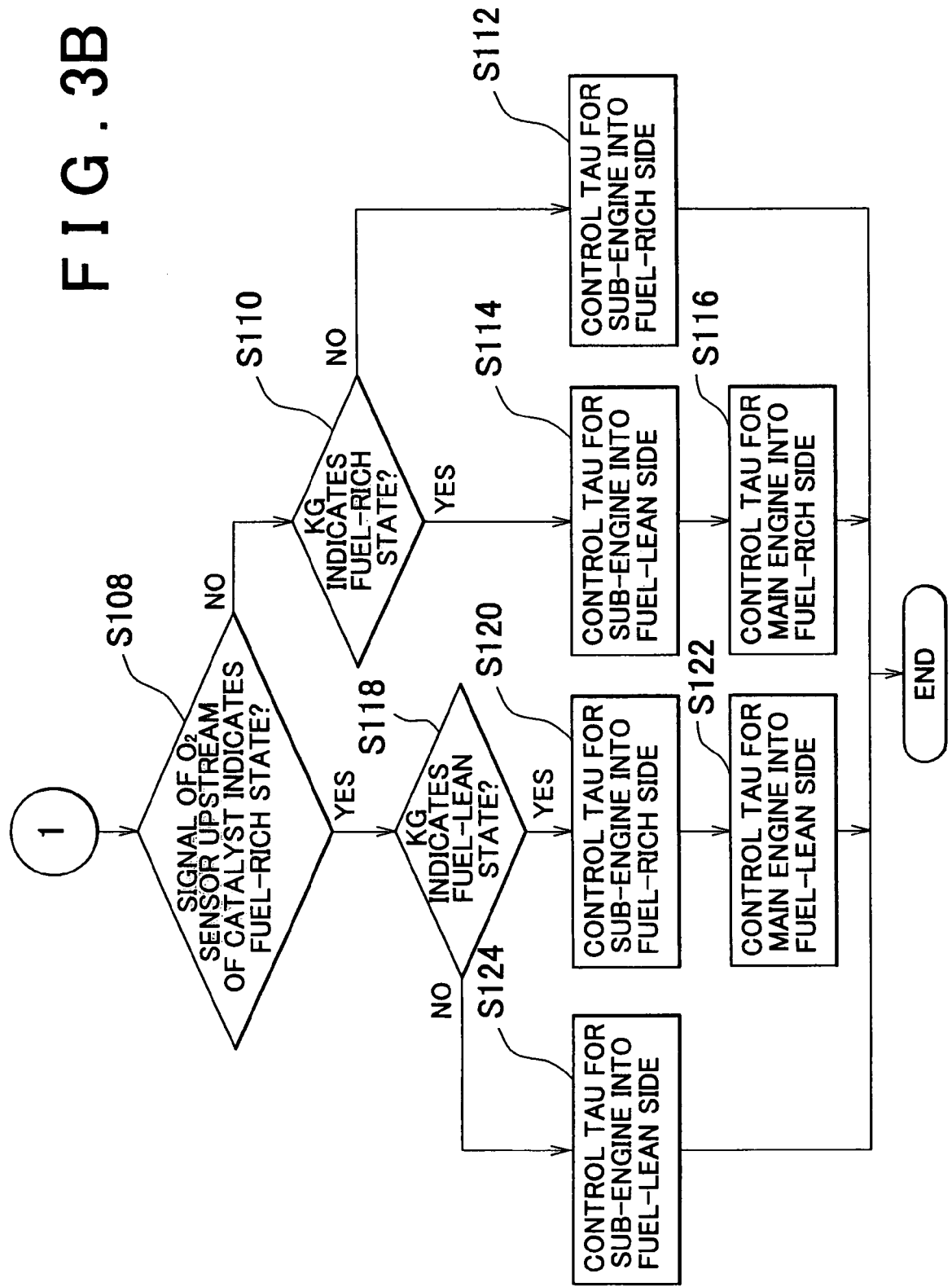

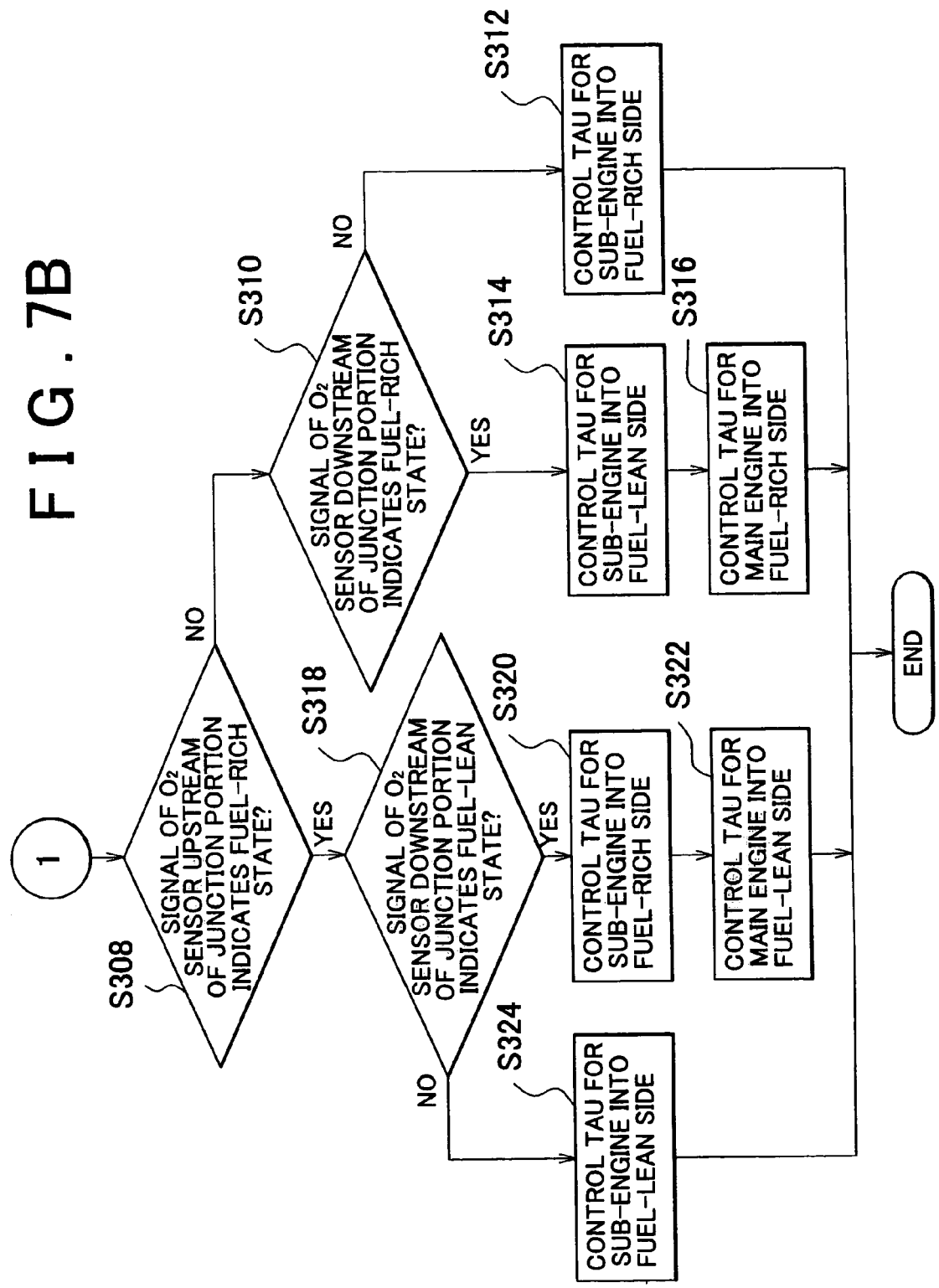

EXHAUST EMISSION CONTROL SYSTEM

INCORPORATION BY REFERENCE

The disclosures of Japanese Patent Applications No. 2003-182952 filed on Jun. 26, 2003, and No. 2003-15370 filed on Jan. 23, 2003 including the specifications, drawings and abstracts are incorporated herein by reference in their entireties.

BACKGROUND OF THE INVENTION

1. Field of Invention

The invention relates to an exhaust emission control system in a vehicle including a plurality of engines.

2. Description of Related Art

JP-A-6-93855 (pp.3–4, FIG. 1) discloses a vehicle including two engines, that is, a primary engine and a secondary engine, one or both of which may be operated for driving in accordance with the running state. In the aforementioned vehicle of the publication, exhaust gas discharged from the primary engine is supplied to a turbine of a turbocharger via an exhaust manifold that extends to the rear of the primary engine, and is further supplied to a case that contains an exhaust catalyst via an exhaust pipe. The exhaust gas then flows into a silencer via an exhaust pipe provided downstream of the catalyst for noise muffling, and is finally discharged into atmosphere. The exhaust gas discharged from the secondary engine is supplied to an exhaust pipe provided downstream of the exhaust catalyst via an exhaust manifold that extends to the rear of the secondary engine so as to join the exhaust gas discharged from the primary engine.

In the aforementioned type of the vehicle, however, the exhaust gas from the secondary engine joins the exhaust gas from the primary engine at a point downstream of the exhaust catalyst, and then discharged into atmosphere. That is, the exhaust gas from the secondary engine is discharged into atmosphere without having its harmful components removed.

SUMMARY OF THE INVENTION

It is an object of the invention to provide an exhaust emission control system that removes harmful components of the exhaust gas discharged from an auxiliary engine so as to prevent deterioration in the exhaust emission.

An exhaust emission control system for a vehicle including a primary engine and a secondary engine having a displacement smaller than that of the primary engine includes an exhaust passage having a junction portion at which exhaust gas discharged from the primary engine and exhaust gas discharged from the secondary engine join together, and an exhaust emission purifying device that purifies the exhaust gas joined at the junction portion in the exhaust passage. In this case, the exhaust gas from the primary engine joins the exhaust gas from the secondary engine at a junction portion formed on an exhaust passage so as to be purified in the exhaust gas purifying unit. Accordingly, each exhaust gas from the primary and the secondary engines can be purified only by a single exhaust gas purifying unit.

In this case, it is preferable that the secondary engine is operated to drive the accessories of the vehicle. Therefore, those accessories can be driven in an efficient operation range without being influenced by the operation state of the primary engine.

An exhaust emission control system for a vehicle including a primary engine and a secondary engine having a displacement smaller than that of the primary engine includes an exhaust emission purifying device that purifies exhaust gas discharged from the secondary engine. The exhaust emission purifying device is warmed under heat of exhaust gas discharged from the primary engine. According to an embodiment of the invention, the exhaust gas purifying unit for purifying the exhaust gas discharged from the secondary engine is warmed under the heat of the exhaust gas discharged from the primary engine. Accordingly the exhaust gas purifying unit can be kept in an activated state in spite of a low frequency of operating the secondary engine. This makes it possible to purify the exhaust gas discharged from the secondary engine.

The aforementioned system allows the secondary engine to be operated for driving accessories of the vehicle. In this case, accessories for the vehicle are driven by the secondary engine. Therefore, those accessories can be driven in an efficient operation range without being influenced by the operation state of the primary engine.

The aforementioned system further includes a primary engine exhaust emission purifying device provided between the primary engine and the junction portion so as to purify the exhaust gas discharged from the primary engine. In the aforementioned structure, the primary engine exhaust gas purifying unit provided upstream of the junction portion serves to purify the exhaust gas discharged from the primary engine. This makes it possible to reduce the flow rate of the exhaust gas to be purified by the exhaust gas purifying unit downstream of the junction portion, resulting in reduction in size of the exhaust gas purifying unit.

The aforementioned system further includes a primary engine air/furl ratio detection unit provided between the primary engine exhaust emission purifying device and the junction portion so as to detect an air/fuel ratio of the exhaust gas discharged from the primary engine. In this case, the primary engine air/fuel ratio detection unit is provided upstream of the junction portion. Therefore, the air/fuel ratio of the exhaust gas from the primary engine can be detected under no influence of the exhaust gas from the secondary engine. This makes it possible to detect the air/fuel ratio of the exhaust gas from the primary engine accurately.

In the aforementioned system, the exhaust passage is branched into a plurality of passages between the primary engine air/fuel ratio detection unit and the junction portion, and preferably, at least one of the plurality of passages is connected with the junction portion. The aforementioned structure may reduce the exhaust gas flowing from the primary engine into the exhaust gas purifying unit, restraining decrease in the temperature of the exhaust gas purifying unit owing to the exhaust gas at a low temperature discharged from the primary engine. This makes it possible to prevent decrease in the ratio of purifying the exhaust gas from the secondary engine.

The aforementioned system further includes a first air/fuel ratio detection unit provided between the primary engine and the junction portion for detecting an air/fuel ratio of exhaust gas, a second air/fuel ratio detection unit provided downstream of the exhaust emission purifying device for detecting an air/fuel ratio of the exhaust gas. An air/fuel ratio of air/fuel mixture each admitted into the primary engine and the secondary engine is controlled based on the air/fuel ratio detected by the first air/fuel ratio detection unit and the air/fuel ratio detected by the second air/fuel ratio detection unit, respectively. In this case, the air/fuel ratio of the air/fuel mixture to be admitted by the primary engine and the secondary engine, respectively is determined based on the air/fuel ratio of the exhaust gas detected by the first air/fuel ratio detection unit between the primary engine and the junction portion, and the air/fuel ratio of the exhaust gas detected by the second air/fuel ratio detection unit downstream of the exhaust gas purification unit, respectively. This makes it possible to control the air/fuel ratio of the exhaust gas from the secondary engine requiring no direct detection thereof.

The aforementioned system further includes a third air/fuel ratio detection unit provided between the primary engine and the junction portion for detecting an air/fuel ratio of exhaust gas, a fourth air/fuel ratio detection unit provided between the secondary engine and the junction portion for detecting an air/fuel ratio of exhaust gas. An air/fuel ratio of air/fuel mixture admitted into the primary engine is controlled based on the air/fuel ratio detected by the third air/fuel ratio detection unit, and an air/fuel ratio of air/fuel mixture admitted into the secondary engine is controlled based on the air/fuel ratio detected by the fourth air/fuel ratio detection unit. In this case, the third air/fuel ratio detection unit is provided between the primary engine and the junction portion, and the fourth air/fuel ratio detection unit is provided between the secondary engine and the junction portion. Therefore, the air/fuel ratio of the exhaust gas from the primary engine can be detected by the third air/fuel ratio detection unit, and the air/fuel ratio of the exhaust gas from the secondary engine can be detected by the fourth air/fuel ratio detection unit under no influence thereof. This makes it possible to control each air/fuel ratio of the exhaust gas from the primary and the secondary engine, respectively with high accuracy.

The aforementioned system further includes a fifth air/fuel ratio detection unit provided between the primary engine and the junction portion for detecting an air/fuel ratio of exhaust gas, a sixth air/fuel ratio detection unit provided between the junction portion and the exhaust emission purifying device for detecting an air/fuel ratio of exhaust gas. An air/fuel ratio of air/fuel mixture admitted into the primary engine is controlled based on the air/fuel ratio detected by the fifth air/fuel ratio detection unit, and an air/fuel ratio of air/fuel mixture admitted into the secondary engine is controlled based on the air/fuel ratio detected by the sixth air/fuel ratio detection unit. In this case, the fifth air/fuel ratio detection unit is provided between the primary engine and the junction portion, and the sixth air/fuel ratio detection unit is provided between the junction portion and the exhaust gas purification unit. As a result, the exhaust gas from the secondary engine serves to activate the sixth air/fuel ratio detection unit at an earlier stage. This makes it possible to start the air/fuel ratio control at an earlier stage.

In the aforementioned system, an activated state of the exhaust emission purifying device is determined, and the secondary engine is started when it is determined that the exhaust emission purifying device is not in the activated state. If it is determined that the exhaust gas purification unit is not in an activated state, the secondary engine is started. Then the exhaust gas from the secondary engine serves to raise the temperature of the exhaust gas purification unit so as to be activated.

Preferably the aforementioned system further includes a temperature detection unit that detects a temperature of an catalyst of the exhaust emission purifying device, wherein the secondary engine is stopped when the detected temperature of the catalyst is equal to or higher than a predetermined value. When the temperature of the exhaust catalyst is equal to or higher than a predetermined value, the secondary engine is stopped by cutting the fuel supply thereto. The intake air into the secondary engine is supplied to the exhaust catalyst under pressure. The aforementioned intake air serves to cool the exhaust catalyst, preventing the exhaust catalyst from being excessively heated. This makes it possible to prevent deterioration in the purification capability of the exhaust catalyst.

In the aforementioned system, the exhaust emission purifying device is formed as an $NO_x$ absorbing type catalyst, and an air/fuel ratio of air/fuel mixture admitted into the secondary engine is controlled into a rich state with respect to a theoretical air/fuel ratio when quantity of $NO_x$ absorbed in the $NO_x$ absorbing type catalyst becomes equal to or larger than a predetermined value. When the quantity of $NO_x$ absorbed by the $NO_x$ absorbing catalyst becomes equal to or larger than a predetermined value, the air/fuel ratio of the exhaust gas from the secondary engine that is not related to the operation for driving the vehicle is brought into a fuel rich state. This makes it possible to perform reduction in the $NO_x$ absorbing catalyst, thus reducing the exhaust emission without deteriorating drivability of the vehicle.

The aforementioned system further includes a first valve position detection unit that detects an exhaust valve position of the primary engine, a second valve position detection unit that detects an intake valve position of the primary engine, a third valve position detection unit that detects an exhaust valve position of the secondary engine, and a fourth valve position detection unit that detects an intake valve position of the secondary engine. In this system, an operation for stopping a drive of the primary engine is inhibited when it is determined that the intake valve and the exhaust valve of the primary engine are opened based on output values detected by the first and the second valve position detection units. An operation for stopping a drive of the secondary engine is inhibited when it is determined that the intake valve and the exhaust valve of the secondary engine are opened based on output values detected by the third and the fourth valve position detection units. If it is determined that the intake valve and the exhaust valve of the primary engine are opened, stop of operation of the primary engine is prohibited. If it is determined that the intake valve and the exhaust valve of the secondary engine are opened, stop of operation of the secondary engine is prohibited. This makes it possible to prevent the exhaust gas from the engine in operation from reverse flowing into the intake pipe of the stopped engine.

Preferably the aforementioned system further includes a first intake air quantity detection unit that detects a flow rate of intake air admitted into the primary engine, and a second intake air quantity detection unit that detects a flow rate of intake air admitted into the secondary engine. In this system, quantity of fuel injected into the primary engine is controlled in accordance with the flow rate of intake air detected by the first intake air quantity detection unit, and quantity of fuel injected into the secondary engine is controlled in accordance with the flow rate of intake air detected by the second intake air quantity detection unit. Each intake air quantity admitted by the primary engine and the secondary engine is independently detected, resulting in highly accurate detection of the intake air quantity. Each of the fuel injection quantity supplied to the primary engine and the secondary engine is controlled in accordance with the detected intake air quantity. This makes it possible to control the air/fuel ratio of the exhaust gas from the primary engine and the secondary engine, respectively with high accuracy.

BRIEF DESCRIPTION OF THE DRAWINGS

FIG. 1 is a schematic view showing a whole structure of an exhaust emission control system according to a first embodiment;

FIG. 3A and FIG. 3B are a flowchart representing the air/fuel ratio feedback control executed in the exhaust emission control system according to the first embodiment;

FIG. 7A and FIG. 7B are a flowchart representing an air/fuel ratio feedback control executed in the exhaust emission control system according to the third embodiment;

DETAILED DESCRIPTION OF PREFERRED EMBODIMENTS

Figure 2A:
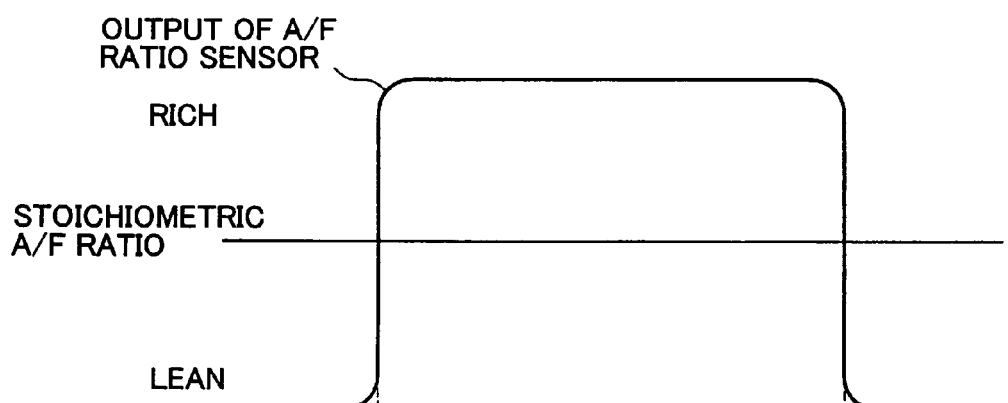
FIG. 2A shows a waveform output from an $O_2$ sensor under the air/fuel ratio feedback control.

Embodiments of the invention will be described hereinafter referring to the drawings. The same elements in the respective embodiments are designated as the same reference numerals, and each description of those elements, thus, will be omitted.

First Embodiment

A whole structure of an exhaust emission control system 1A according to a first embodiment will be described referring to FIG. 1.

The exhaust emission control system 1A includes a main engine 5 and a sub-engine 6 having lower displacement than that of the main engine 5.

The exhaust emission control system 1A further includes an exhaust catalyst 4 that purifies exhaust gas discharged from both the main engine 5 and the sub-engine 6, air/fuel ratio sensors 45a, 45b provided upstream and downstream of the exhaust catalyst 4 respectively, and an electronic control unit 9 that controls each air/fuel ratio of the air/fuel mixture in the main engine 5 and the sub-engine 6 based on the respective output values of the air/fuel ratio sensor 45a, 45b.

A main starter 20 is provided at a joint portion where the main engine 5 is connected with a transmission 10. A crankshaft (drive shaft) 5a of the main engine 5 is provided with an electromagnetic clutch 30 that connects/disconnects transfer of the driving force of the main engine 5. The driving force output from the main engine 5 is transferred to a main crank pulley 5b via the electromagnetic clutch 30.

The sub-engine 6 functions as a gasoline engine of 100 to 150 cc displacement, having thermal efficiency improved by elongating the stroke or increasing the expansion ratio, for example. The sub-engine 6 is provided with a sub starter 22 via a gear (not shown). A crankshaft (drive shaft) 6b of the sub-engine 6 is connected with a planetary gear unit 7 that amplifies the driving force of the sub-engine 6 via a one-way clutch 60.

The one-way clutch 60 serves to transfer the driving force output from the sub-engine 6 to the planetary gear unit 7 while cutting the transfer of the driving force of the main engine 5 via a belt B1 and the planetary gear unit 7.

The planetary gear unit 7 is formed of a sun gear 7a, a planetary gear 7b provided around the sun gear 7a, a ring gear 7c provided on the outer periphery of the planetary gear 7b, and a planetary carrier that holds the planetary gear 7b.

The crank shaft 6b is connected with the sun gear 7a. The driving force of the sub-engine 6 that has been transferred to the sun gear 7a is amplified in accordance with a gear ratio (reduction gear ratio) of the planetary gear unit 7, and output from the planetary carrier 7d.

The gear ratio of the planetary gear unit 7 can be expressed as a following equation (1).

$$\text{gear ratio} = \frac{1+\rho}{\rho} \qquad (1)$$

where the number of teeth of the sun gear 7a is represented as Zs, the number of teeth of the ring gear 7c is represented as Zi, and $$\rho = \frac{Zs}{Zi}.$$

In this embodiment, the gear ratio is set to 6. Therefore, the planetary gear unit 7 amplifies the driving force of the sub-engine 6 six times, and reduces the rotational speed to ⅙. The aforementioned gear ratio is determined based on the driving force of the sub-engine 6, the maximum starting torque of the main engine 5, and the like.

The driving force output from the planetary carrier 7d is transferred to a sub crank pulley 6c formed as a double pulley provided with a large-diameter pulley 6d and a small-diameter pulley 6e having the smaller diameter than that of the large-diameter pulley 6d in this embodiment.

The belt B1 is set around the small diameter pulley 6e and the main crank pulley 5b so as to transfer the driving force therebetween.

In this embodiment, although the pulley ratio between the small diameter pulley 6e and the main crank pulley 5b is set to 2.5, it is not limited thereto. The aforementioned pulley ratio makes it possible to further amplify the driving force to be transferred to the main engine 5 by 2.5 times.

Accordingly, the driving force of the sub-engine 6 may be amplified by 15 times and the rotational speed thereof may be reduced to 1/15 resulting from the combination of the planetary gear unit 7 with the pulley ratio between the main crank pulley 5b and the small diameter pulley 6e.

A belt B2 is set around a pulley 8a attached to accessories (for a vehicle) such as a water pump, an alternator, a power steering pump, and a compressor for air conditioning unit. As the large diameter pulley 6d rotates, the pulley 8a attached to the accessories is rotated, thus driving those accessories.

In the main engine 5, intake air flow from an air cleaner 200 is throttled by an electronically controlled throttle valve 230 provided in an intake pipe 220. The intake air then flows through an intake manifold 240 so as to be admitted into each cylinder of the main engine 5. The flow rate of the admitted air from the air cleaner 200 is detected by an air flow meter 210 provided between the air cleaner 200 and the throttle valve 230. The air flow meter 210 serves as a first intake air quantity detecting unit. The air flow meter 210 in this embodiment may be formed as a hot wire air flow sensor.

The intake manifold 240 is provided with an injector 244 through which the fuel supplied under pressure thereinto is injected. In each of the cylinders, the intake air and the fuel are mixed and burned. The resultant exhaust gas is then discharged into an exhaust manifold 250.

The exhaust manifold 250 is connected with an exhaust pipe 260, downstream of which is provided with the exhaust catalyst 4. The exhaust catalyst 4 is provided with a catalytic temperature sensor 51 for detecting the catalytic temperature of the exhaust catalyst 4. That is, the catalytic temperature sensor 51 serves as the temperature detection unit.

The exhaust catalyst 4 is a three-way catalyst that oxidizes hydrocarbon (HC) and carbon monoxide (CO) contained in the exhaust gas and reduces nitrogen oxides ($NO_x$) at the same time such that the harmful gas component of the exhaust gas is purified into harmless carbon dioxide ($CO_2$), steam ($H_2O$), and nitrogen ($N_2$). That is, the exhaust catalyst 4 serves as the exhaust emission purifying device.

The exhaust catalyst 4 becomes effective when its temperature is increased to be equal to or higher than a specific activated temperature. Therefore, the function of the exhaust catalyst 4 for removing the harmful components cannot be fully performed until the catalytic temperature reaches the specific activated temperature.

In the sub-engine 6, the intake air flow from an air cleaner 202 is throttled by an electronically controlled throttle valve 232 provided in an intake pipe 222, and then is admitted into each cylinder of the sub-engine 6. The flow rate of the intake air from the air cleaner 202 is detected by an air flow meter 212 provided between the air cleaner 202 and the throttle valve 232. That is, the air flow meter 212 serves as the second intake air quantity detection unit. The air flow meter 212 in this embodiment may be formed as a hot wire air flow sensor.

An intake pipe 222 is provided with an injector 246 through which the fuel supplied under pressure thereinto is injected. In each cylinder of the sub-engine 6, the intake air and the fuel are mixed and burned. The resultant exhaust gas is discharged into an exhaust pipe 262.

The exhaust pipe 262 is joined to the exhaust pipe 260 of the main engine 5 at a joint portion 264 upstream of the exhaust catalyst 4. The exhaust gas discharged from the sub-engine 6 to the exhaust pipe 262 joins the exhaust gas of the main engine 5, which will be purified by the exhaust catalyst 4.

The electronic control unit (ECU) 9 includes an ECU for controlling the main engine 5 (hereinafter referred to as a main ECU) 40 and an ECU for controlling the sub-engine 6 (hereinafter referred to as a sub ECU) 50.

The main ECU 40 is connected with a crank position sensor 41 that detects a crank position of the main engine 5, an accelerator opening sensor 42 that detects an opening an accelerator pedal, an intake air temperature sensor 43 that detects a temperature of intake air admitted into the main engine 5, a water temperature sensor 44 that detects a cooling water temperature, an air flow meter 210 that detects a flow rate of intake air admitted into the main engine 5, and an intake air pressure sensor 45 that detects a pressure of the intake air.

Each position of the intake valve and the exhaust valve of the main engine 5 can be obtained based on the crank position of the main engine 5 detected by the crank position sensor 41. That is, the crank position sensor 41 serves as both a first and a second valve position detection units.

The main ECU 40 includes a microprocessor that executes various computations, a ROM that stores programs to allow the microprocessor to executes various types of processing, a RAM that stores various data such as computed results, and a back-up RAM in which the stored data are maintained by a battery of 12 V (not shown).

The main ECU 40 contains an air/fuel ratio control section 40a for controlling the air/fuel ratio of the air/fuel mixture by adjusting the quantity of the fuel injected through the injector 244. The main ECU 40 controls the fuel injection quantity and the air/fuel ratio.

The main ECU 40 also contains an ignition timing calculating section 40b that calculates the timing for igniting the air/fuel mixture using a spark plug, an electromagnetic clutch control section 40c that controls engagement/disengagement of the electromagnetic clutch 30, a load control section 40d that adjusts the load of the accessory 8, and an engine stop control section 40e that inhibits the main engine 5 or the sub-engine 6 from stopping. The main ECU 40 serves to calculate the ignition timing, and control an operation of the electromagnetic clutch, load, and stop operation of the engine.

The sub ECU50 is connected with the accelerator opening sensor that detects the opening degree of the accelerator pedal, a catalytic temperature sensor (temperature detecting unit) 51 that detects a catalytic temperature of the exhaust catalyst 4, the crank position sensor 52 that detects the crank position of the sub-engine 6, the air flow meter 212 that detects the flow rate of air admitted into the sub-engine 6, and the like.

Each position of the intake valve and the exhaust valve of the sub-engine 6 is obtained based on the crank position of the sub-engine 6 that has been detected by the crank position sensor 52. The crank position sensor 52, therefore, serves as both the third and the fourth valve position detection units.

The sub ECU 50 is formed of the same components (microprocessor and the like) as those of the main ECU 40.

The sub ECU 50 contains a sub-engine starting section 50a that stops or re-starts the sub-engine 6 based on the output value from the catalytic temperature sensor 51. The sub ECU 50 serves to sop and start the secondary engine. The sub ECU 50 calculates an optimum value of the fuel injection quantity or the ignition timing based on the output value from various sensors such that operations of the sub-engine 6 are controlled based on the calculated optimum values. The sub ECU 50 serves to control the fuel injection quantity and the air/fuel ratio.

The main ECU 40 and the sub ECU 50 are connected via a communication line 48 such that data are exchanged therebetween.

Figure 2B:
FIG. 2B shows a waveform of a correction coefficient FAF for the air/fuel ratio feedback control.
Figure 2C:
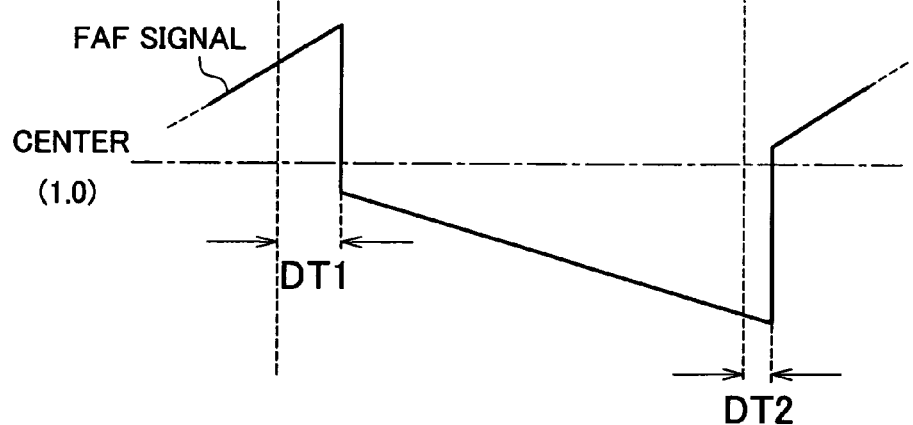
FIG. 2C shows another example of a waveform of a correction coefficient FAF for the air/fuel ratio feedback control.

The air/fuel ratio feedback control for the main engine 5 will be briefly described referring to FIGS. 2A to 2C. The air/fuel ratio feedback control for the sub-engine 6 is identical to that for the main engine 5. The description of such control, therefore, will be omitted.

Under the air/fuel ratio feedback control, the air/fuel ratio of the air/fuel mixture is adjusted into a theoretical air/fuel ratio so as to reduce the exhaust emission. The aforementioned control is performed by executing the program stored in the ROM of the main ECU 40 based on the detection results from the various sensors connected with the main ECU 40.

Each of the air/fuel ratio sensors 45a, 45b is formed as an $O_2$ sensor (hereinafter referred to as the $O_2$ sensor 45a, and $O_2$ sensor 45b). The $O_2$ sensor 45a is interposed between the main engine 5 and the joint portion 264, and the $O_2$ sensor 45b is provided downstream of the exhaust catalyst 4. Each of those $O_2$ sensors 45a, 45b is characterized in that the output value changes in accordance with the concentration of oxygen contained in the exhaust gas. This makes it possible to determine whether the air/fuel ratio of the air/fuel mixture burned in the main engine 5 is in the fuel rich state or in the fuel lean state with respect to the theoretical air/fuel ratio based on the output value from the $O_2$ sensors 45a, 45b in terms of ON/OFF. A whole-area air/fuel ratio sensor (linear air/fuel ratio sensor) that is capable of linearly detecting the air/fuel ratio of the air/fuel mixture burned in the main engine 5 may be employed in place of the $O_2$ sensors 45a, 45b.

The ECU 40 executes the air/fuel ratio feedback control or the correction control to be described below based on the output values from the aforementioned various sensors so as to determine the fuel injection quantity TAU. Then the fuel is injected from the injector 244 by the quantity as the determined value TAU.

The fuel injection quantity TAU for operating the main engine 5 is determined using the following equation:

$$TAU=\beta TAUP \times EFTOTAL+ \quad (1)$$

The TAUP represents the basic fuel injection quantity defined by the intake air quantity and the engine speed. The obtained TAUP is corrected in accordance with the engine operation state so as to determine the final value representing the fuel injection quantity TAU. The basic fuel injection quantity TAUP may be obtained based on the intake air pressure and the engine speed, or based on the accelerator opening degree and the engine speed.

The term EFTOTAL represents the total value that reflects the air/fuel ratio. The EFTOTAL serves to correct the basic fuel injection quantity TAU so as to adjust the air/fuel ratio into the target air/fuel ratio, such as the intake air temperature correction value based on the intake air temperature. The air/fuel ratio feedback control is executed using the EFTOTAL. The terms $\alpha$ and $\beta$ serves as other correction elements like the warm-up fuel increase correction value immediately after starting, or the acceleration increase correction value upon acceleration. The EFTOTAL may be obtained by adding the air/fuel ratio feedback correction coefficient FAF to an air/fuel ratio learned value KG. In the aforementioned case, the above equation (1) may be expressed in the following equation (2).

$$TAU=\alpha \times TAUP \times (FAF+KG)+\beta \quad (2)$$

The air/fuel ratio feedback correction coefficient FAF is used for correcting the feedback correction so as to control the air/fuel ratio derived from the oxygen concentration within the exhaust gas detected by the $O_2$ sensors 45a, 45b into the target value. For example, referring to FIGS. 2A and 2B, if the air/fuel ratio detected by the $O_2$ sensors 45a, 45b represents the fuel rich state with respect to the theoretical air/fuel ratio, the feedback correction coefficient FAF is set to the value to gradually decrease the fuel injection quantity. If the air/fuel ratio detected by the $O_2$ sensors 45a, 45b representative of the fuel rich state has been changed to represent the fuel lean state, the feedback correction coefficient FAF is set to the value to increase the fuel injection quantity for improving the response in a skip manner.

Meanwhile if the air/fuel ratio detected by the $O_2$ sensors 45a, 45b represents the fuel lean state with respect to the theoretical air/fuel ratio, the feedback correction coefficient FAF is set to the value to gradually increase the fuel injection quantity. If the air/fuel ratio detected by the $O_2$ sensors 45a, 45b representative of the fuel lean state has been changed to represent the fuel rich state, the feedback correction coefficient FAF is set to the value to decrease the fuel injection quantity for improving the response in a skip manner. In this way, the air/fuel ratio feedback correction coefficient FAF serves to keep the air/fuel ratio always at the theoretical air/fuel ratio value.

The delay time DT1 or DT2 may be considered for the air/fuel ratio feedback correction coefficient FAF so as to cope with the delay in detecting operation performed by the $O_2$ sensor 45a or 45b as shown in FIG. 2C.

The air/fuel ratio learned value KG is a correction value that serves to reflect the individual difference or the change over time in the respective injector 244 and $O_2$ sensors 45a, 45b on the air/fuel ratio. The aforementioned air/fuel ratio learned value KG is derived from the air/fuel ratio feedback correction coefficient FAFAV that has been obtained by averaging the air/fuel ratio feedback correction coefficients FAF.

If the average value of the air/fuel ratio feedback correction coefficients FAFAV takes a value that represents the fuel lean state, the air/fuel ratio learned value KG is increased so as to increase the fuel injection quantity TAU. Meanwhile if the average value of the FAFAV takes a value that represents the fuel rich state, the air/fuel ratio learned value KG is decreased so as to decrease the fuel injection quantity TAU.

Under the air/fuel ratio feedback control using the air/fuel ratio feedback correction coefficient FAF, the air/fuel ratio can be corrected into the theoretical air/fuel ratio without using the aforementioned air/fuel ratio learned value KG. However, the air/fuel ratio learned value KG makes it possible to correct the air/fuel ratio into the theoretical value at an earlier stage with higher accuracy not only in the open loop control but also the feedback control by considering the individual difference or the change over time in the respective elements of the engines. The air/fuel ratio learned value KG is stored in the back-up RAM of the main ECU 40 after learning and then read when it is required.

The aforementioned air/fuel ratio feedback correction coefficient FAF or the air/fuel ratio learned value KG are calculated and updated by the program stored in the ROM of the main ECU 40. Based on those values FAF and KG calculated in the main ECU 40, the fuel injection quantity TAU is determined. The fuel is then injected by the determined quantity TAU.

Figure 3A:
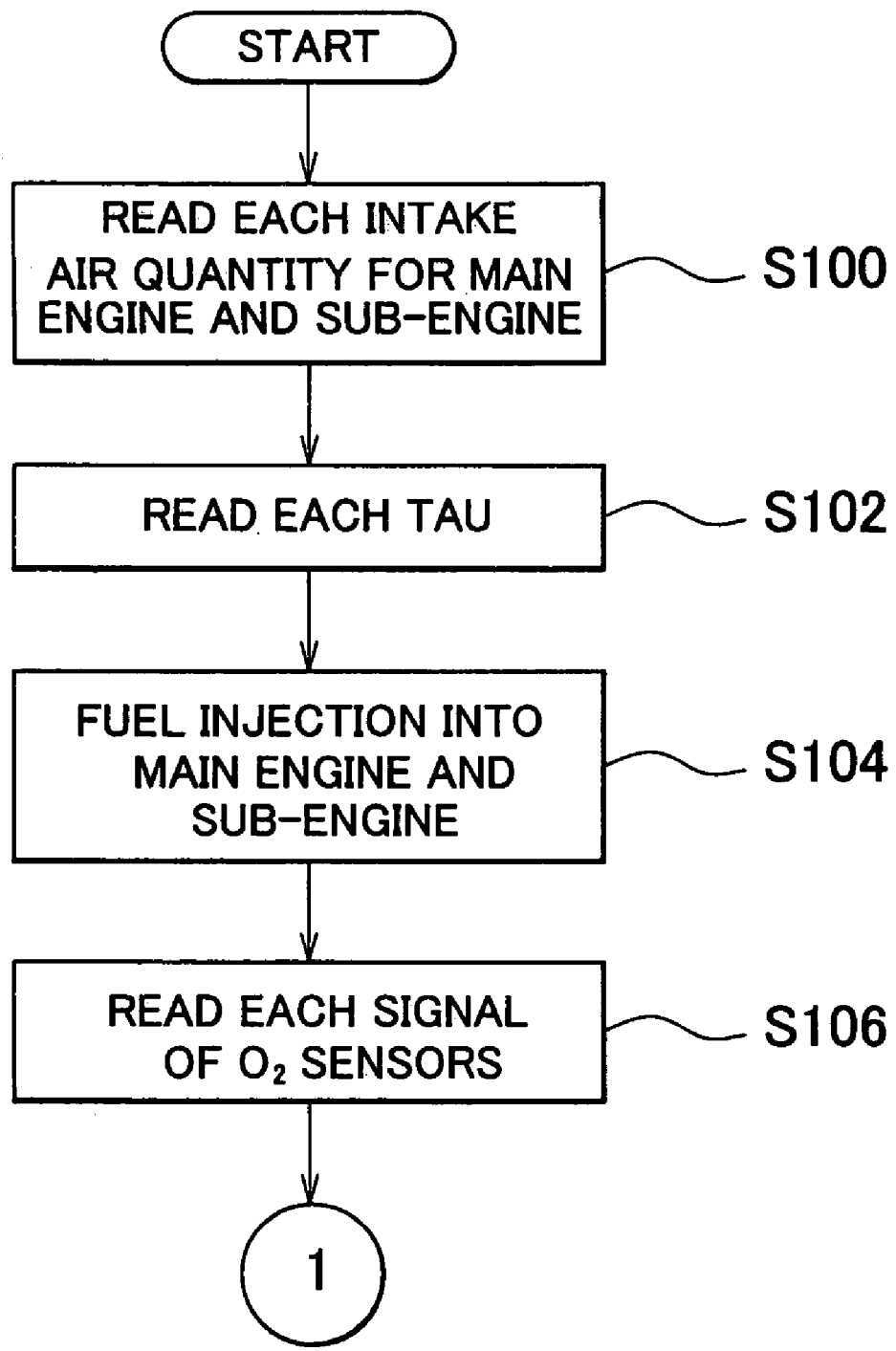

Referring to the flowchart of FIGS. 3A and 3B, operations of the exhaust emission control system 1A will be described. The flowchart represents the air/fuel ratio feedback control executed in the exhaust emission control system 1A.

First in step S100, a flow rate of intake air admitted into the main engine 5 is detected by the air flow meter 210, and the detected intake air quantity is sent to the main ECU 40. A flow rate of intake air admitted into the sub-engine 6 is detected by the air flow meter 212, and the detected intake air quantity is sent to the sub ECU 50.

In step S102, each fuel injection quantity TAU for the main engine 5 and the sub-engine 6 is calculated using the above-described equation (2) based on the detected flow rate of intake air admitted into the main engine 5 and the sub-engine 6, respectively, which have been read in step S100.

In step S104, the injectors 244 and 246 are opened for a period to be taken for injecting the fuel by the fuel injection quantity TAU for the main engine 5 and the sub-engine 6, respectively, which have been calculated in step S102. Then the intake air and the injected fuel are mixed and admitted into the respective cylinders of both engines so as to be burned therein. The resultant exhaust gas is discharged into the exhaust pipes 260, 262.

In step S106, an output signal corresponding to the air/fuel ratio of the air/fuel mixture determined based on the oxygen concentration of the exhaust gas is read from the $O_2$ sensor 45a provided upstream of the exhaust catalyst 4 and the $O_2$ sensor 45b provided downstream of the exhaust catalyst 4, respectively.

In step S108, it is determined whether the output of the $O_2$ sensor 45a upstream of the catalyst represents that the exhaust gas is in the fuel rich state. If NO is obtained in step S108, that is, it is determined that the output from the $O_2$ sensor 45a does not indicate the fuel rich state, the process proceeds to step S110. Meanwhile, if YES is obtained in step S108, that is, it is determined that the output from the $O_2$ sensor 45a indicates the fuel rich state, the process proceeds to step S118.

In step S110, it is further determined whether the air/fuel ratio learned value KG obtained based on the output signal of the $O_2$ sensor 45b downstream of the catalyst indicates deviation of the air/fuel ratio to the fuel rich state. If NO is obtained in step S110, the process proceeds to step S112 where the air/fuel ratio feedback correction coefficient FAF is set to the value so as to gradually increase the fuel injection quantity for controlling the fuel injection quantity TAU for the sub-engine 6 into the fuel rich side. Then the routine ends. If YES is obtained in step S110, the process proceeds to step S114.

In step S114, the air/fuel ratio feedback correction coefficient FAF is set to the value so as to gradually decrease the fuel injection quantity for controlling the fuel injection quantity TAU for the sub-engine 6 into the fuel lean side.

In step S116, the air/fuel ratio feedback correction coefficient FAF is set to the value so as to gradually increase the fuel injection quantity for controlling the fuel injection quantity TAU for the main engine 5 into the fuel rich side. Then the routine ends.

If YES is obtained in step S108, the process proceeds to step S118 where it is determined whether the air/fuel ratio learned value KG indicates deviation of the air/fuel ratio to the fuel lean side based on the output signal of the $O_2$ sensor 45b downstream of the catalyst. If NO is obtained in step S118, the process proceeds to step S124 where the air/fuel ratio feedback coefficient FAF is set to the value to gradually decrease the fuel injection quantity for controlling the fuel injection quantity TAU for the sub-engine 6 into the fuel lean side. The routine then ends. Meanwhile, if YES is obtained in step S118, the process proceeds to step S120.

In step S120, the air/fuel ratio feedback correction coefficient TAF is set to the value to gradually increase the fuel injection quantity for controlling the fuel injection quantity TAU for the sub-engine 6 into the fuel rich side.

Then in step S122, the air/fuel ratio feedback correction coefficient FAF is set to the value to gradually decrease the fuel injection quantity for controlling the fuel injection quantity for the main engine 5 into the fuel lean side. The routine then ends.

In this embodiment, the $O_2$ sensors 45a, 45b are provided upstream and downstream of the exhaust catalyst 4 so as to execute the air/fuel ratio feedback control for the main engine 5 and the sub-engine 6, respectively. The aforementioned air/fuel ratio control of the main engine 5 and the sub-engine 6 makes it possible to reduce the exhaust emission.

Second Embodiment

Figure 4:
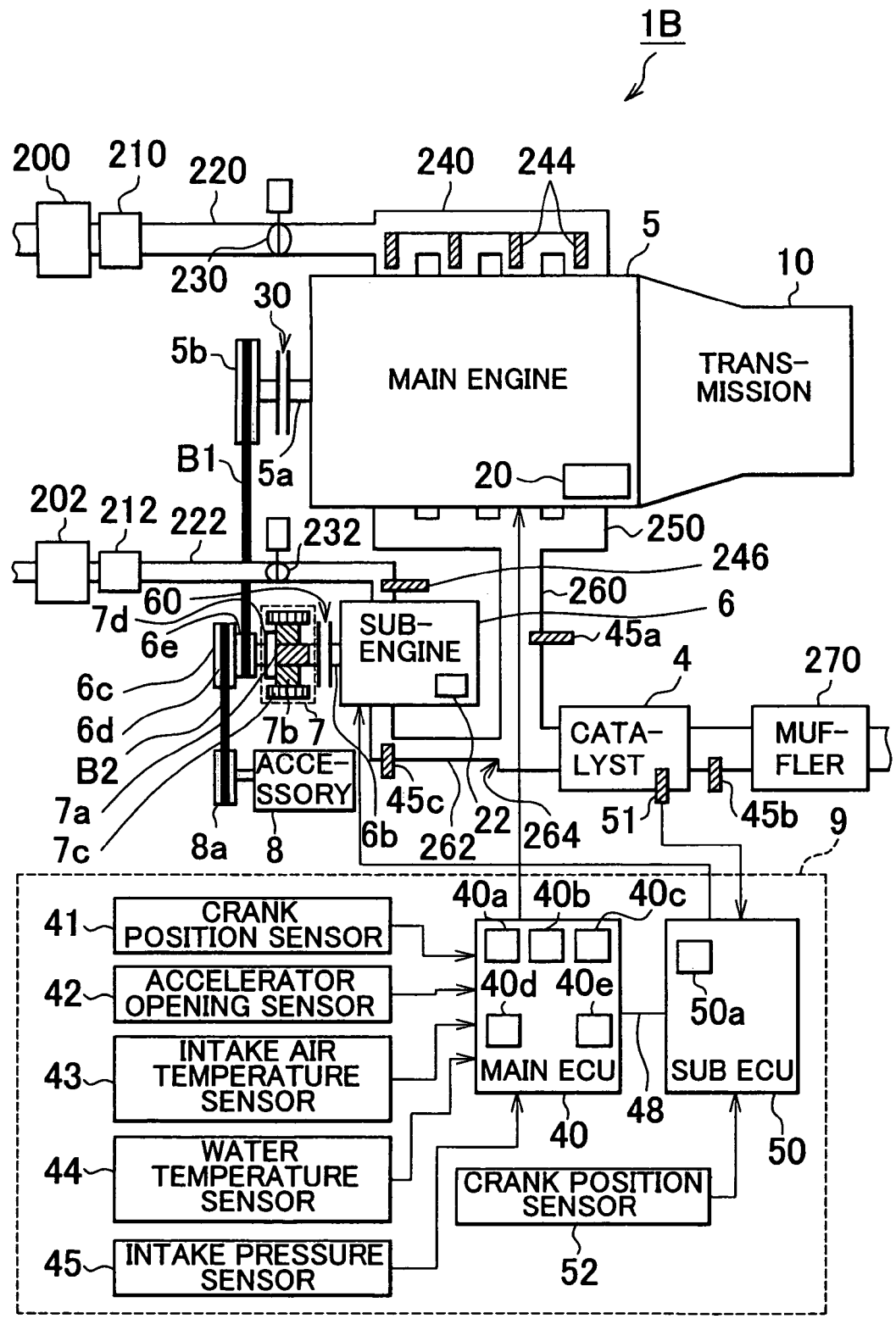
FIG. 4 is a schematic view showing a whole structure of an exhaust emission control system according to a second embodiment.

Referring to FIG. 4, the structure of an exhaust emission control system 1B according to a second embodiment will be described. The same elements of the exhaust emission control system 1B as those of the exhaust emission control system 1A according to the first embodiment will be designated with the same reference numerals.

The exhaust emission control system 1B of this embodiment is the same as the exhaust emission control system 1A of the first embodiment except that an $O_2$ sensor 45c is provided between the sub-engine 6 and the junction portion 264 in addition to the $O_2$ sensor 45a between the main engine 5 and the junction portion 264, and the $O_2$ sensor 45b downstream of the exhaust catalyst 4.

Figure 5A:
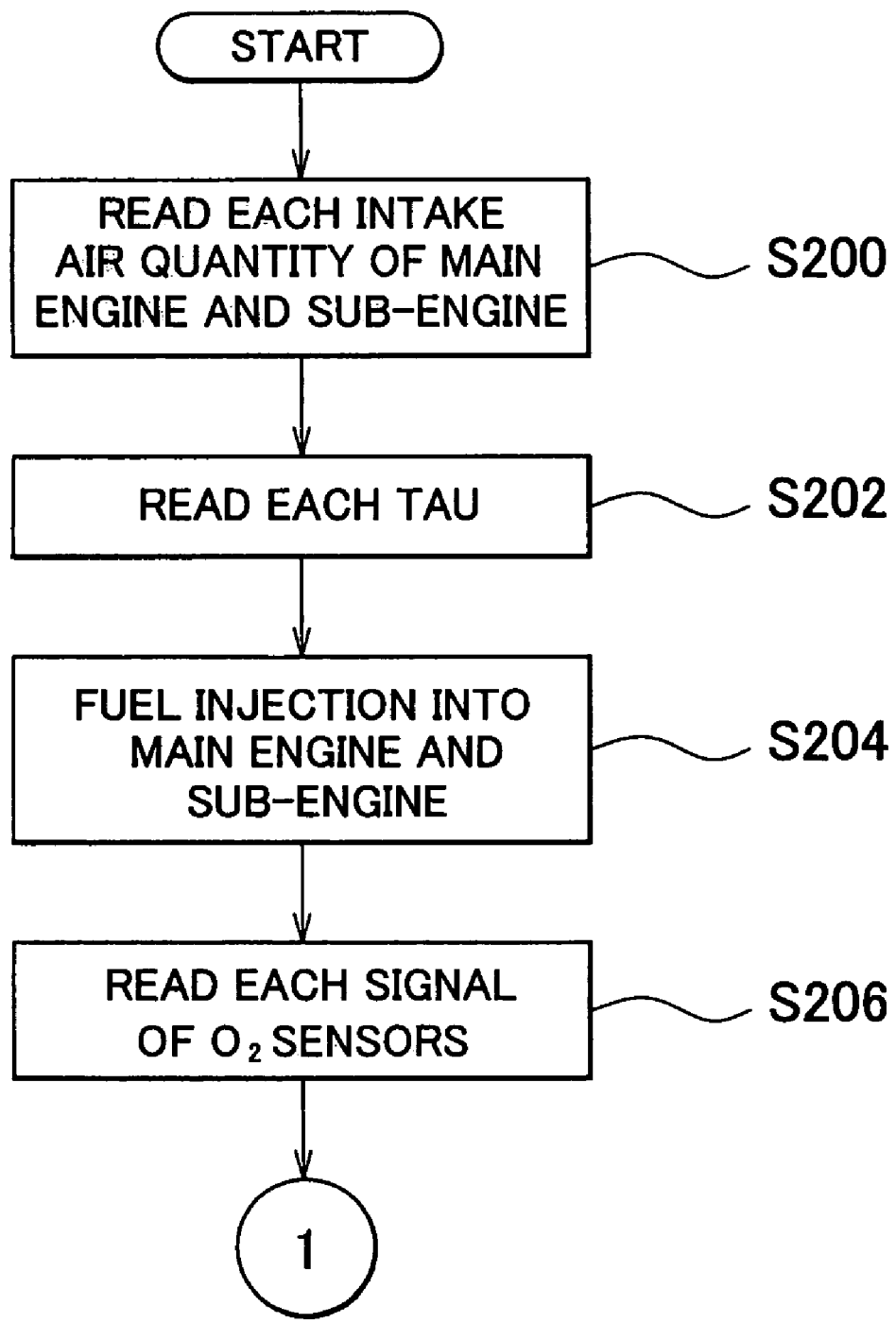
FIGS. 5A to 5C are a flowchart representing an air/fuel ratio feedback control executed in the exhaust emission control system according to the second embodiment.
Figure 5B:
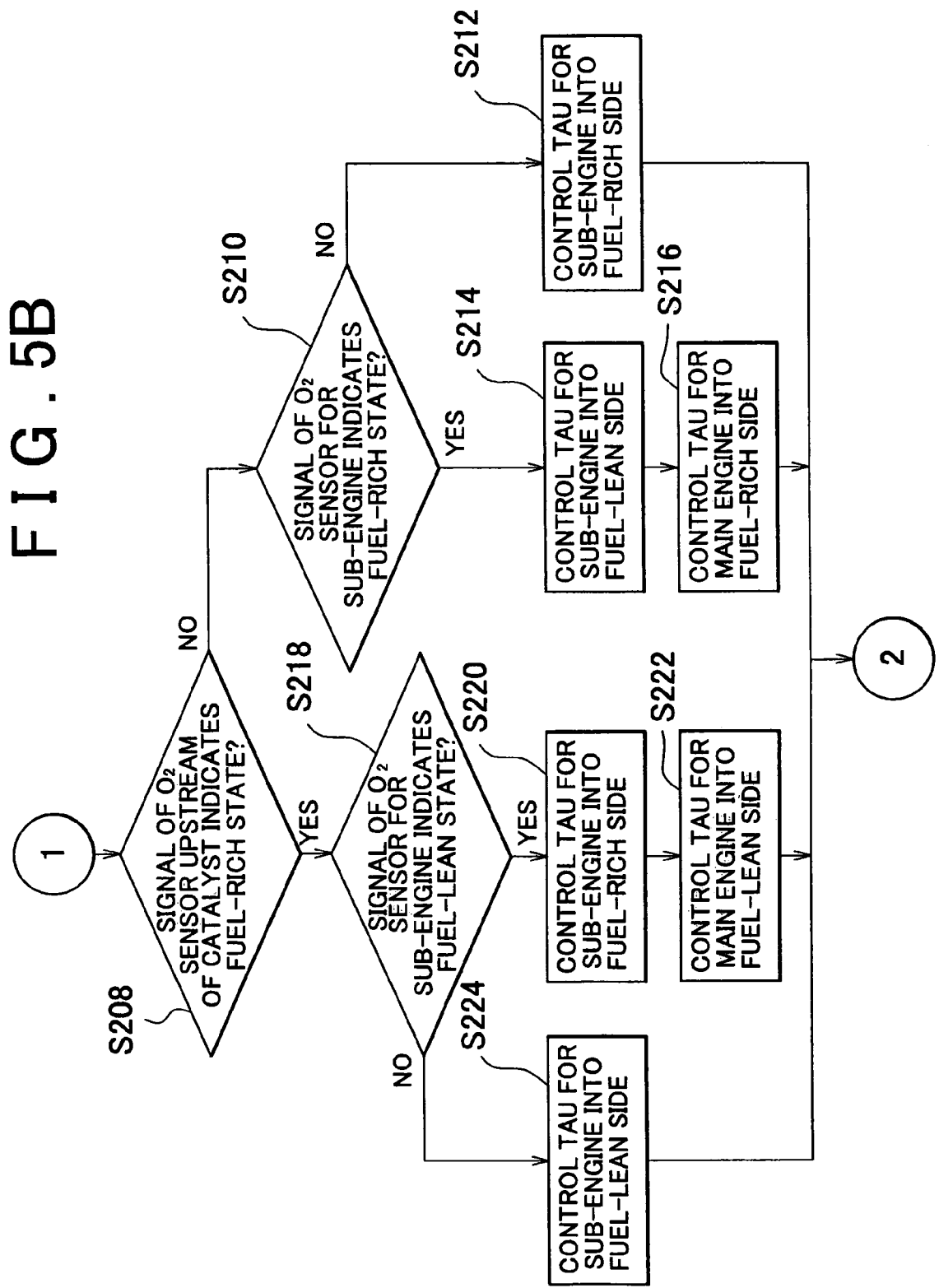
Figure 5C:
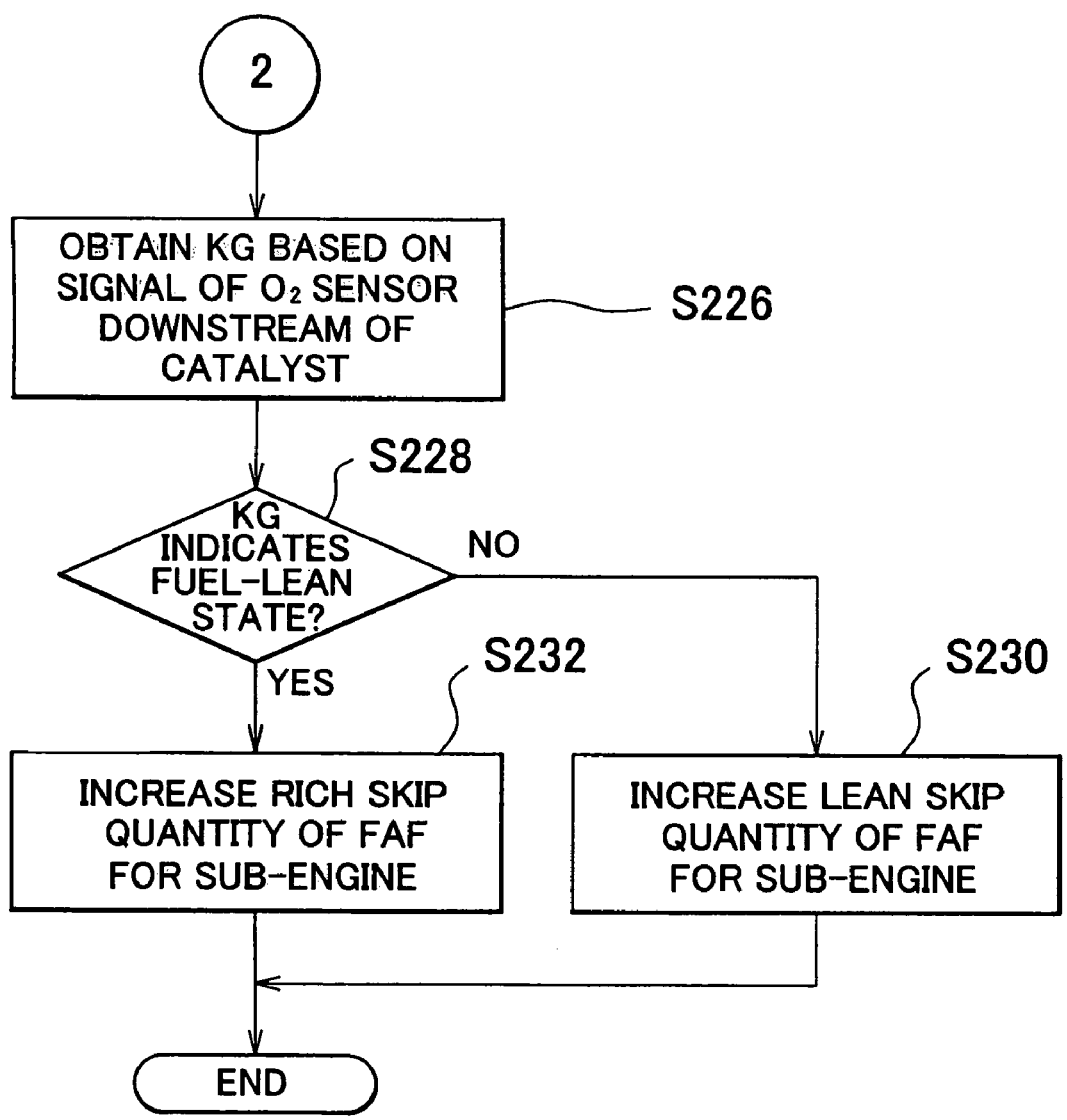

The air/fuel ratio feedback control executed in the exhaust emission control system 1B will be described referring to a flowchart of FIGS. 5A to 5C.

In step S200, the intake air quantity admitted into the main engine 5 is read from the air flow meter 210 to the main ECU 40, and the intake air quantity admitted into the sub-engine 6 is read from the air flow meter 212 to the sub ECU 50, respectively.

In step S202, each of the fuel injection quantity TAU for the main engine 5 and the sub-engine 6 is calculated using the equation (2) based on each value of the intake air quantity admitted by the main engine 5 and the sub-engine 6, which has been read in step S200.

In step S204, the injectors 244 and 246 are opened for a period to be taken for injecting the fuel by the fuel injection quantity TAU for the main engine 5 and the sub-engine 6, which have been calculated in step S202. Then the fuel is injected into the main engine 5 and the sub-engine 6, respectively. The intake air is mixed with the injected fuel, and the resultant air/fuel mixture is burned in the respective cylinders. The exhaust gas is then discharged into the exhaust pipes 260 and 262.

In step S206, signals output from the $O_2$ sensor 45a provided in the exhaust pipe 260, the $O_2$ sensor 45c provided in the exhaust pipe 262, and the $O_2$ sensor 45b provided downstream of the exhaust catalyst 4 each corresponding to the air/fuel ratio of the air/fuel mixture based on the oxygen concentration of the exhaust gas output signals are read.

In step S208, it is determined whether the output of the $O_2$ sensor 45a provided in the exhaust pipe 260 represents the fuel rich state. If NO is obtained, that is, it is determined that the output does not represent the fuel-rich state, the process proceeds to step S210. Meanwhile if NO is obtained in step S208, that is, it is determined that the output represents the fuel rich state, the process proceeds to step S218.

In step S210, it is determined whether the output of the $O_2$ sensor 45c provided in the exhaust pipe 262 represents the fuel rich state. If NO is obtained in step S210, the process proceeds to step S212 where the air/fuel ratio feedback correction coefficient FAF is set to the value so as to gradually increase the fuel injection quantity for controlling the fuel injection quantity TAU for the sub-engine 6 into the fuel rich side. The process then proceeds to step S226. Meanwhile, if YES is obtained in step S210, the process proceeds to step S214.

In step S214, the air/fuel ratio feedback correction coefficient FAF is set to the value so as to gradually decrease the fuel injection quantity for controlling the fuel injection quantity TAU for the sub-engine 6 into the fuel lean side.

The process proceeds to step S216 where the air/fuel ratio correction coefficient FAF is set to the value so as to gradually increase the fuel injection quantity for controlling the fuel injection quantity TAU for the main engine 5 into the fuel rich side. The process then proceeds to step S226.

If YES is obtained in step S208, the process proceeds to step S218 where it is determined whether the output of the $O_2$ sensor 45c provided in the exhaust pipe 262 represents the fuel lean state. If NO is obtained in step S218, the process proceeds to step S224 where the air/fuel ratio feedback correction coefficient FAF is set to the value so as to gradually decrease the fuel injection quantity for controlling the fuel injection quantity TAU for the sub-engine 6 into the fuel lean side. The process then proceeds to step S226. Meanwhile, if YES is obtained in step S218, the process proceeds to step S220.

In step S220, the air/fuel ratio correction coefficient FAF is set to the value so as to gradually increase the fuel injection quantity for controlling the fuel injection quantity TAU for the sub-engine 6 into the fuel rich state.

In step S222, the air/fuel ratio correction coefficient FAF is set to the value so as to gradually decrease the fuel injection quantity for controlling the fuel injection quantity TAU for the main engine 5 into the fuel lean side. The process then proceeds to step S226.

In step S226, the air/fuel ratio learned value KG is obtained based on the output signal of the $O_2$ sensor 45b downstream of the catalyst.

In step S228, it is determined whether the air/fuel ratio learned value KG obtained in step S226 represents deviation of the air/fuel ratio into the fuel-lean side. If NO is obtained in step S228, the process proceeds to step S230 where the lean skip amount of the air/fuel ratio feedback correction coefficient FAF for the sub-engine 6 is increased. The routine then ends. Meanwhile if YES is obtained in step S228, the process proceeds to step S232.

In step S232, the rich skip amount of the air/fuel ratio feedback correction coefficient FAF for the sub-engine 6 is increased. The routine then ends.

In this embodiment, the $O_2$ sensor 45a detects the air/fuel ratio of the air/fuel mixture in the main engine 5, and the $O_2$ sensor 45c detects the air/fuel ratio of the air/fuel mixture in the sub-engine 6 independently. This makes it possible to control each air/fuel ratio of the air/fuel mixture in the main engine 5 and the sub-engine 6 with higher accuracy.

Third Embodiment

Figure 6:
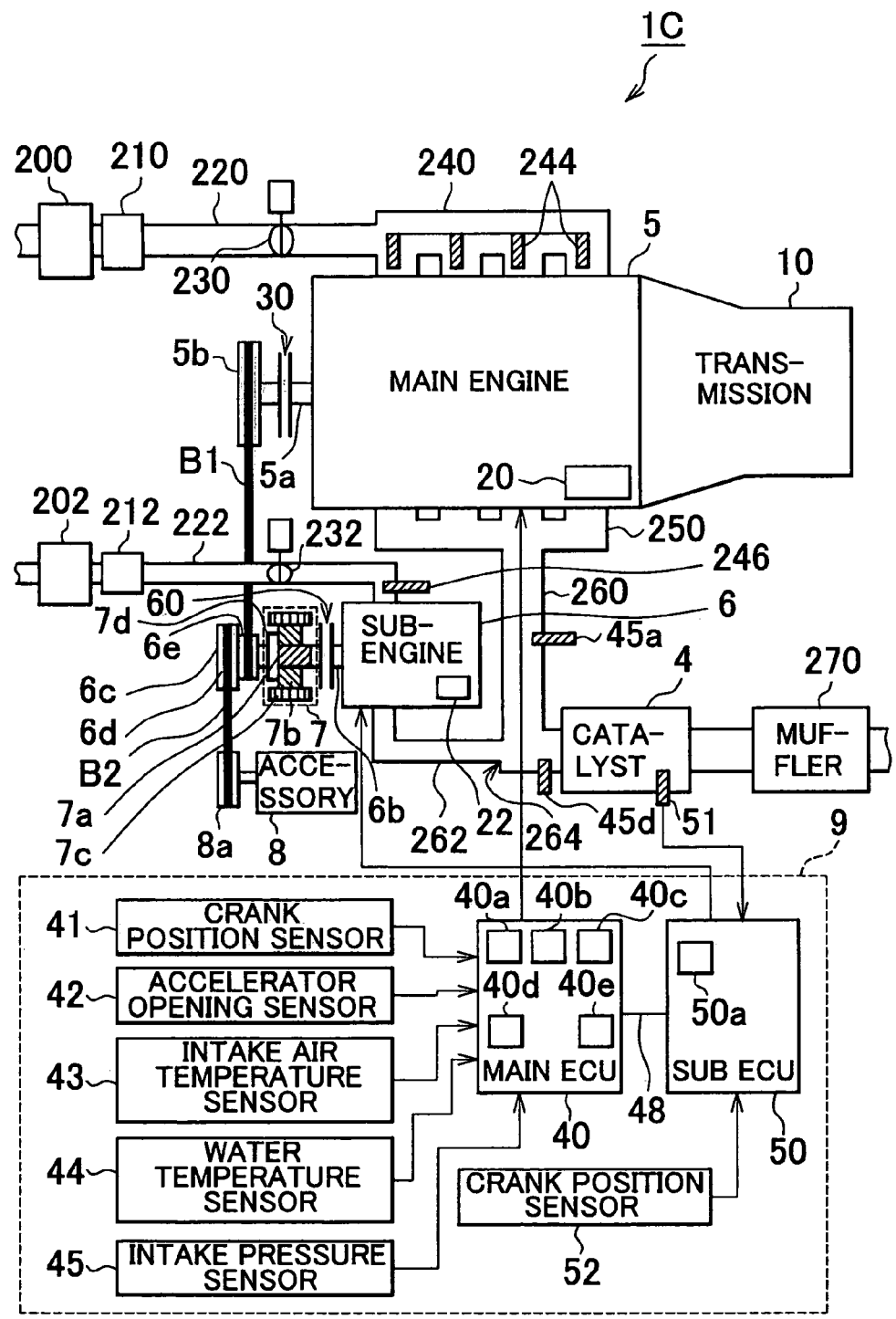
FIG. 6 is a schematic view showing a whole structure of an exhaust emission control system according to a third embodiment.

The structure of an exhaust emission control system 1C according to a third embodiment will be described referring to FIG. 6. In FIG. 6, the same elements of the exhaust emission control system 1C as those of the exhaust emission control system 1A according to the first embodiment will be designated with the same reference numerals.

The third embodiment is the same as the first embodiment except that an $O_2$ sensor 45d is provided between the junction portion 264 and the exhaust catalyst 4 in place of the $O_2$ sensor 45b provided downstream of the exhaust catalyst 4.

Figure 7A:
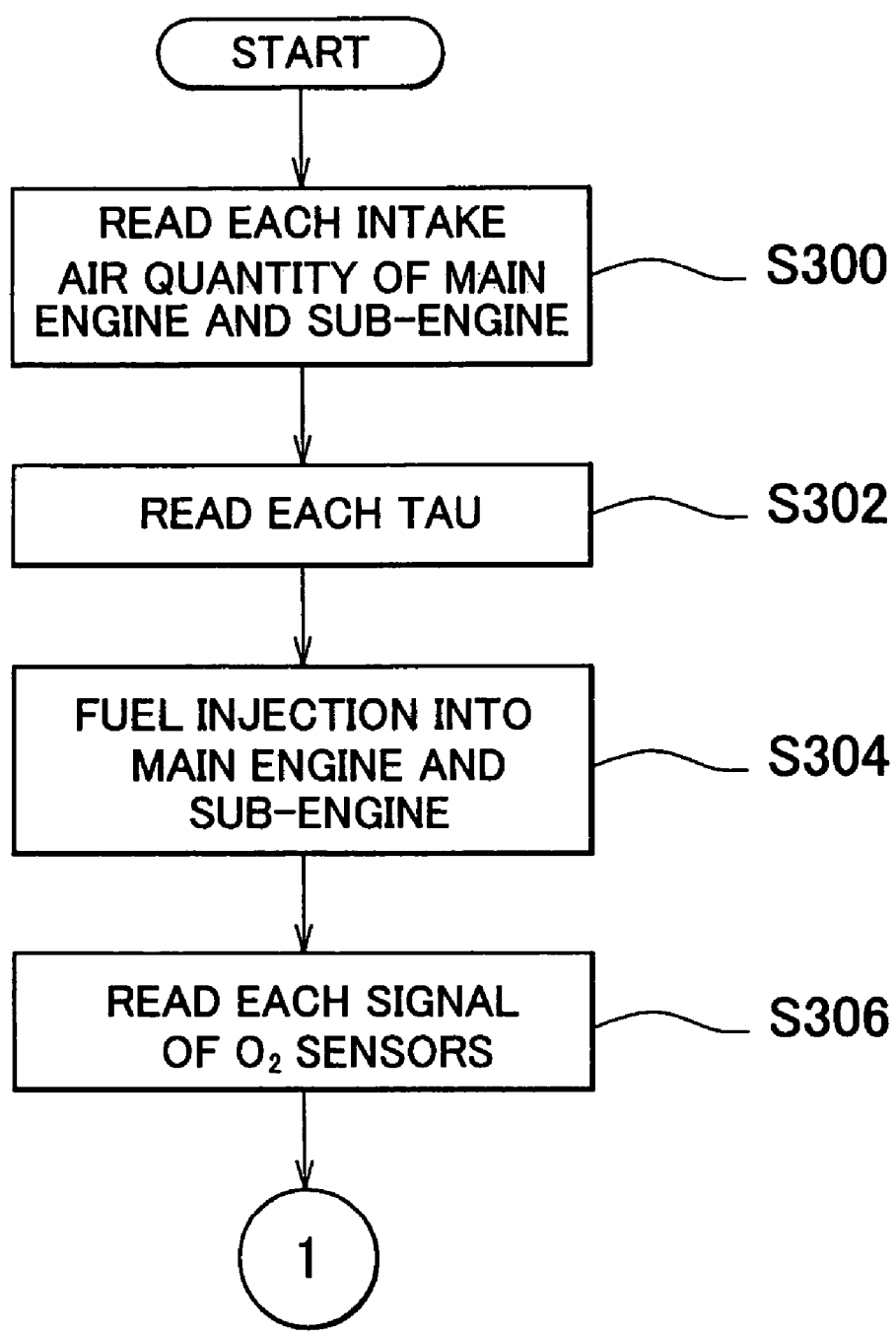

The air/fuel ratio feedback control executed in the exhaust gas emission control system 1C will be described referring to the flowchart of FIGS. 7A and 7B.

In step S300, a flow rate of intake air admitted into the main engine 5 is detected by the air flow meter 210, and the detected result is read by the main ECU 40. A flow rate of intake air admitted into the sub-engine 6 is detected by the air flow meter 212, and the detected result is read by the sub ECU 50.

In step S302, each fuel injection quantity TAU for the main engine 5 and the sub-engine 6 is calculated using the equation (2) based on each quantity of the intake air admitted into the main engine 5 and the sub-engine 6, which has been read in step S300.

Then in step S304, the injectors 244 and 246 are opened for a period to be taken for injecting the fuel injection quantity TAU for the main engine 5 and the sub-engine 6, which have been calculated in step S302. Then the fuel is injected into the main engine 5 and the sub-engine 6, respectively. The intake air is mixed with the injected fuel, and the resultant air/fuel mixture is burned in the respective cylinders. The exhaust gas is then discharged into the exhaust pipes 260 and 262.

In step S306, each output signal from the $O_2$ sensor 45a upstream of the junction portion 264, and the $O_2$ sensor 45d downstream of the junction portion 264 is read. The output signal corresponds to the air/fuel ratio of the air/fuel mixture based on the oxygen concentration of the exhaust gas.

In step S308, it is determined whether the output of the $O_2$ sensor 45a upstream of the junction portion 264 represents the fuel-rich state. If NO is obtained in step S308, that is, it is determined that the output of the $O_2$ sensor 45a does not represent the fuel rich state, the process proceeds to step S310. If YES is obtained in step S308, that is, it is determined that the output of the $O_2$ sensor 45a represents the fuel rich state, the process proceeds to step S318.

In step S310, it is determined whether the output of the $O_2$ sensor 45d downstream of the junction portion 264 represents the fuel rich state. If NO is obtained in step S310, the process proceeds to step S312 where the air/fuel ratio feedback correction coefficient FAF is set to the value so as to gradually increase the fuel injection quantity for controlling the fuel injection quantity TAU for the sub-engine 6 into the fuel rich state. The routine then ends. If YES is obtained in step S310, the process proceeds to step S314.

In step S314, the air/fuel ratio feedback correction coefficient FAF is set to the value so as to gradually decrease the fuel injection quantity for controlling the fuel injection quantity TAU for the sub-engine 6 into the fuel lean side.

Then in step S316, the air/fuel ratio feedback correction coefficient FAF is set to the value so as to gradually increase the fuel injection quantity for controlling the fuel injection quantity TAU for the main engine 5 into the fuel rich side. The routine then ends.

Meanwhile if YES is obtained in step S308, the process proceeds to step S318 where it is determined whether the output of the O₂ sensor 45d downstream of the junction portion 264 represents the fuel lean state. If NO is obtained in step S318, the process proceeds to step S324 where the air/fuel ratio feedback correction coefficient FAF is set to the value so as to gradually decrease the fuel injection quantity for controlling the fuel injection quantity TAU for the sub-engine 6 into the fuel lean side. The routine then ends. If YES is obtained in step S318, the process proceeds to step S320.

In step S320, the air/fuel ratio feedback correction coefficient FAF is set to the value so as to gradually increase the fuel injection quantity for controlling the fuel injection quantity TAU for the sub-engine 6 into the fuel rich side.

In step S322, the air/fuel ratio feedback correction coefficient FAF is set to the value so as to gradually decrease the fuel injection quantity for controlling the fuel injection quantity TAU for the main engine 5 into the fuel lean side. The routine then ends. In this embodiment, the exhaust gas discharged from the sub-engine 6 serves to heat the O₂ sensor 45d to reach the activated temperature at an earlier stage so as to start the air/fuel ratio control at an earlier timing. This makes it possible to reduce the exhaust emission.

Fourth Embodiment

Figure 8:
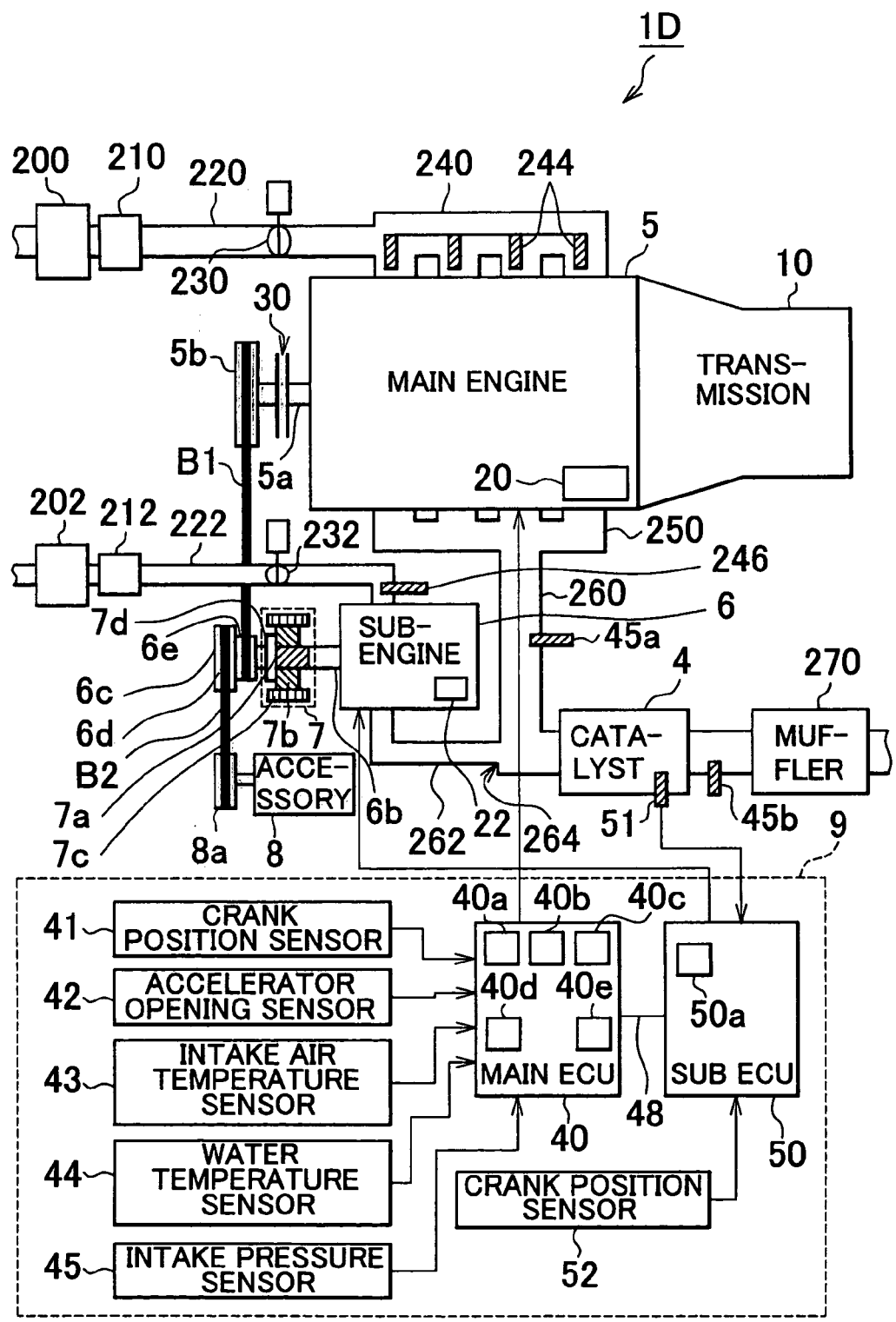
FIG. 8 is a schematic view showing a whole structure of an exhaust emission control system according to a fourth embodiment.

A structure of an exhaust emission control system 1D according to a fourth embodiment will be described referring to FIG. 8. In FIG. 8, the same elements as those of the exhaust emission control system 1A according to the first embodiment will be designated with the same reference numerals.

The fourth embodiment is the same as the first embodiment except that the crankshaft of the sub-engine 6 is not provided with the one-way clutch 60.

Figure 9:
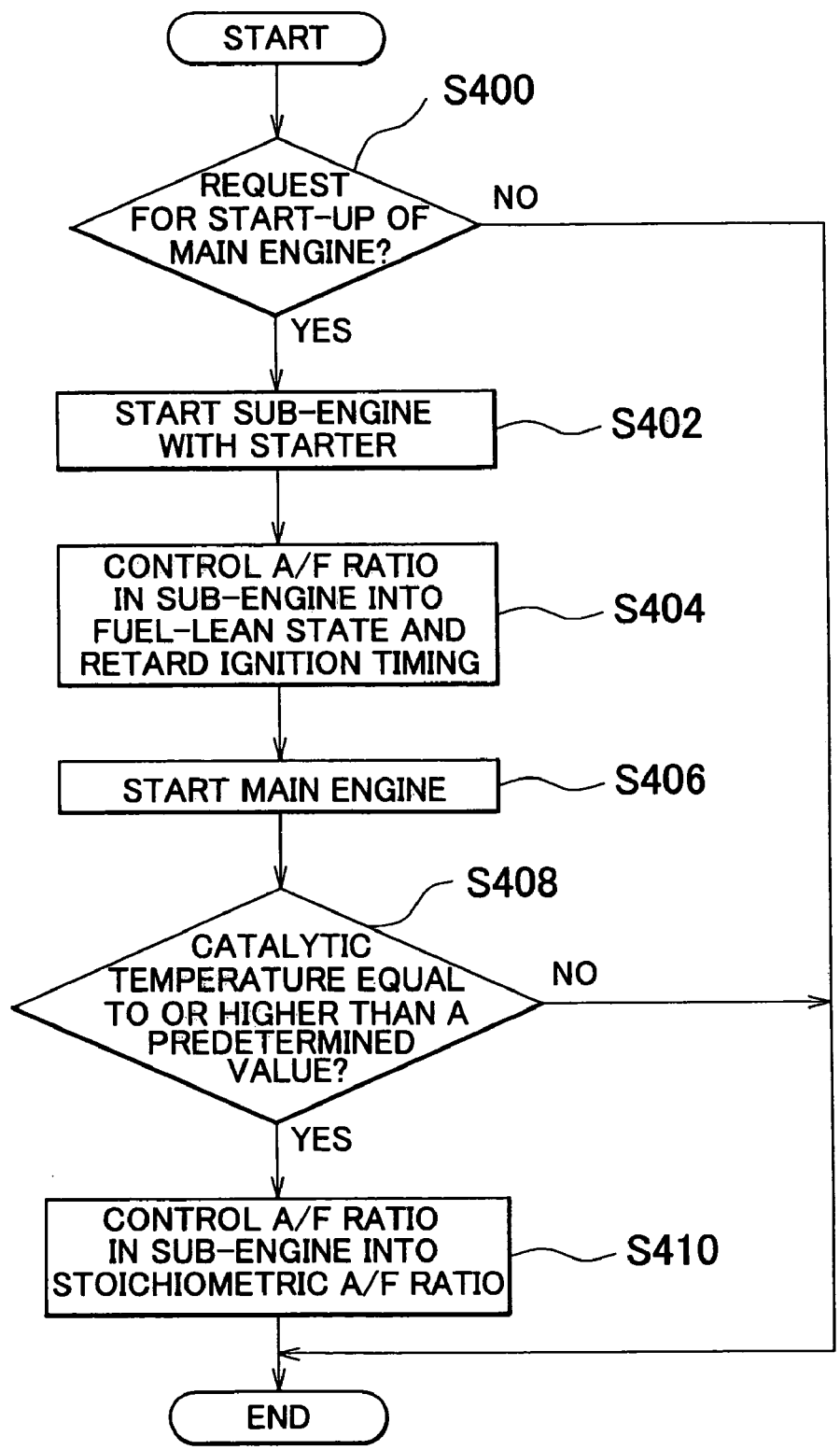
FIG. 9 is a flowchart representing an air/fuel ratio feedback control executed in the exhaust emission control system according to the fourth embodiment.

A routine for activating the catalyst in the exhaust emission control system 1D by operating the sub-engine 6 will be described referring to FIG. 9.

First in step S400, it is determined whether the main engine 5 is required to be re-started. For example, the requirement for re-starting the main engine 5 is determined upon detection of the depression force applied to the accelerator pedal.

If NO is obtained in step S400, that is, it is determined that re-start of the main engine 5 is not required, this routine ends. Meanwhile, if YES is obtained in step S400, that is, re-start of the main engine 5 is required, the process proceeds to step S402.

In step S402, the sub-engine 6 is cranked by a sub starter motor 22, and supplied with the fuel and ignited for starting.

In step S404, the exhaust catalyst 4 is heated in the exhaust gas discharged from the sub-engine 6. For this, the ignition timing in the sub-engine 6 is retarded so as to be operated in the fuel lean state at the air/fuel ratio of 16, for example.

In step S406, the main engine 5 is cranked by a main starter motor 20, and supplied with the fuel and ignited for starting.

In step S408, it is determined whether the temperature of the exhaust catalyst 4 is equal to or higher than a predetermined temperature (for example, 250° C.). If NO is obtained, that is, the temperature of the catalyst 4 is lower than the predetermined temperature, the routine ends without changing the operation state of the sub-engine 6. Meanwhile if YES is obtained, that is, the temperature of the catalyst 4 is equal to or higher than the predetermined temperature, the process proceeds to step S410.

In step S410, the air/fuel ratio in the sub-engine 6 is controlled to the theoretical air/fuel ratio, and the ignition timing that has been retarded is returned into the normal state.

The air/fuel ratio in the sub-engine 6 that is not operated for driving the vehicle is brought into the fuel lean state, and the ignition timing for the sub-engine 6 is retarded so as to activate the exhaust catalyst 4 at an earlier stage without deteriorating drivability. In the above-described structure, the exhaust catalyst 4 may be heated by increasing the quantity of the intake air to the sub-engine 6 so as to increase the quantity of the exhaust gas discharged from the sub-engine 6.

In steps 402 and 404, the sub-engine 6 is operated while the main engine 5 is stopped. If the intake valve and the exhaust valve are opened in the aforementioned state, the exhaust gas from the sub-engine 6 may flow in the reverse direction into the intake pipe of the main engine 5. This may cause fluctuation in the combustion upon re-start of the main engine 5 to the greater degree.

If it is determined that the intake valve and the exhaust valve of the main engine 5 are opened, the stopping operation of the main engine 5 is inhibited. In the aforementioned structure, as at least one of the intake valve and the exhaust valve is closed while stop of the main engine 5, the exhaust gas discharged from the sub-engine 6 does not flow in reverse into the main engine 5.

The structure in which the sub-engine 6 is stopped is the same as the one as described above.

In this embodiment, if it is determined that both the intake and exhaust valves of the main engine 5 and the sub-engine 6 are opened, each stopping operation of the main engine 5 and the sub-engine 6 is inhibited. Alternatively if the main engine 5 is stopped and the sub-engine 6 is operated, or the main engine 5 is operated and the sub-engine 6 is stopped, the electronically controlled throttle valve 230 may be fully closed so as to prevent reverse flow of the exhaust gas.

Figure 10:
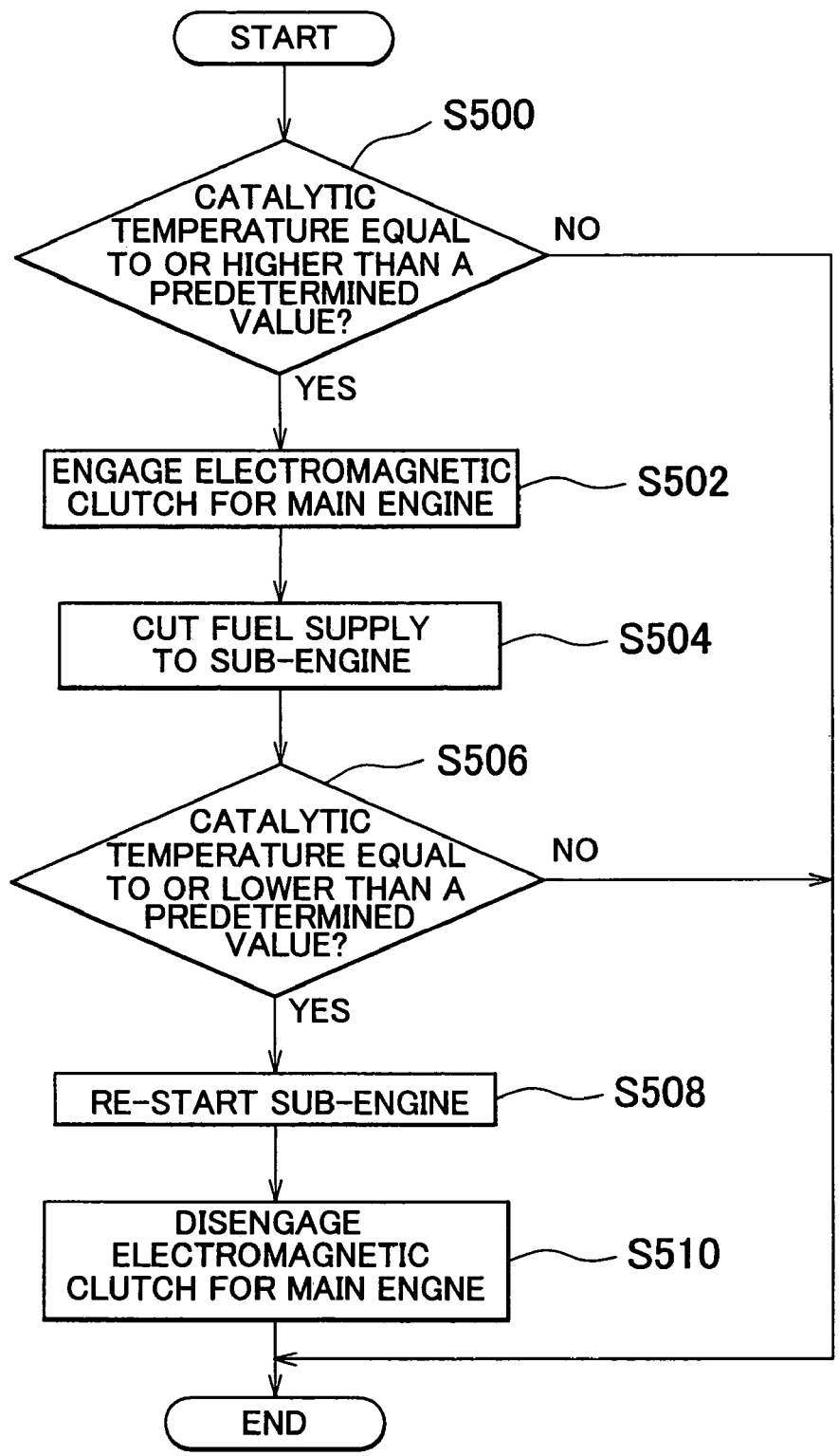
FIG. 10 is a flowchart representing a process for preventing a catalyst in the exhaust emission control system according to the fourth embodiment from being excessively heated.

The control routine for preventing excessive heating of the catalyst executed in the exhaust emission control system 1D will be described referring to FIG. 10.

First in step S500, it is determined whether the temperature of the exhaust catalyst 4 is equal to or higher than a predetermined temperature of 650° C., for example. If NO is obtained in step S500, that is, the catalytic temperature is lower than the predetermined temperature, the routine ends. If YES is obtained in step S500, that is, it is determined that the catalytic temperature is equal to or higher than the predetermined temperature, the process proceeds to step S502.

In step S502, the electromagnetic clutch 30 for the main engine 5 is engaged such that the power generated in the main engine 5 is transferred to the sub-engine 6 via the belt B1. The sub-engine 6 is then cranked.

In step S504, the fuel supply to the sub-engine 6 is interrupted so as to be stopped. Accordingly, the sub-engine 6 is cranked by the power generated by the main engine 5 in the state where the fuel supply thereto is interrupted. In the sub-engine 6, the intake air is supplied to the exhaust pipe 262 under pressure. The air sent by the sub-engine 6 under pressure serves to decrease the temperature of the exhaust catalyst 4.

In step S506, it is determined whether the temperature of the exhaust catalyst 4 is equal to or lower than a predetermined temperature of 500° C., for example. If NO is obtained in step S506, that is, it is determined that the catalytic temperature is higher than the predetermined temperature, the routine ends. If YES is obtained in step S506, that is, it is determined that the catalytic temperature is equal to or lower than the predetermined temperature, the process proceeds to step S508.

In step S508, the sub-engine 6 is supplied with the fuel and ignited for start-up.

In step S510, the electromagnetic clutch 30 for the main engine 5 is disengaged such that the power transfer from the main engine 5 to the sub-engine 6 is interrupted. The routine for preventing excessive heating of the catalyst ends.

When the temperature of the exhaust catalyst 4 reaches the predetermined temperature or higher, the sub-engine 6 serves to send air under pressure to the exhaust catalyst 4 in order to prevent excessive heating of the catalyst.

In this embodiment, the lean burn engine capable of burning the fuel in a fuel lean state (at lean air/fuel ratio) is used as the main engine 5, and a lean $NO_X$ catalyst is used as the exhaust catalyst 4. The lean $NO_X$ catalyst may be formed as a lean $NO_X$ absorption type catalyst (LNC) which absorbs $NO_X$ to be discharged in the fuel lean state, and reduces the absorbed $NO_X$ in the fuel rich state or at the stoichiometric air/fuel ratio.

Because of limitation in the capacity of the lean $NO_X$ absorption type catalyst, the engine operation in the fuel lean state cannot be continued for an extended period. Then the air/fuel ratio is temporarily increased into the fuel rich state to release the absorbed $NO_X$ so as to be reduced.

Figure 11:
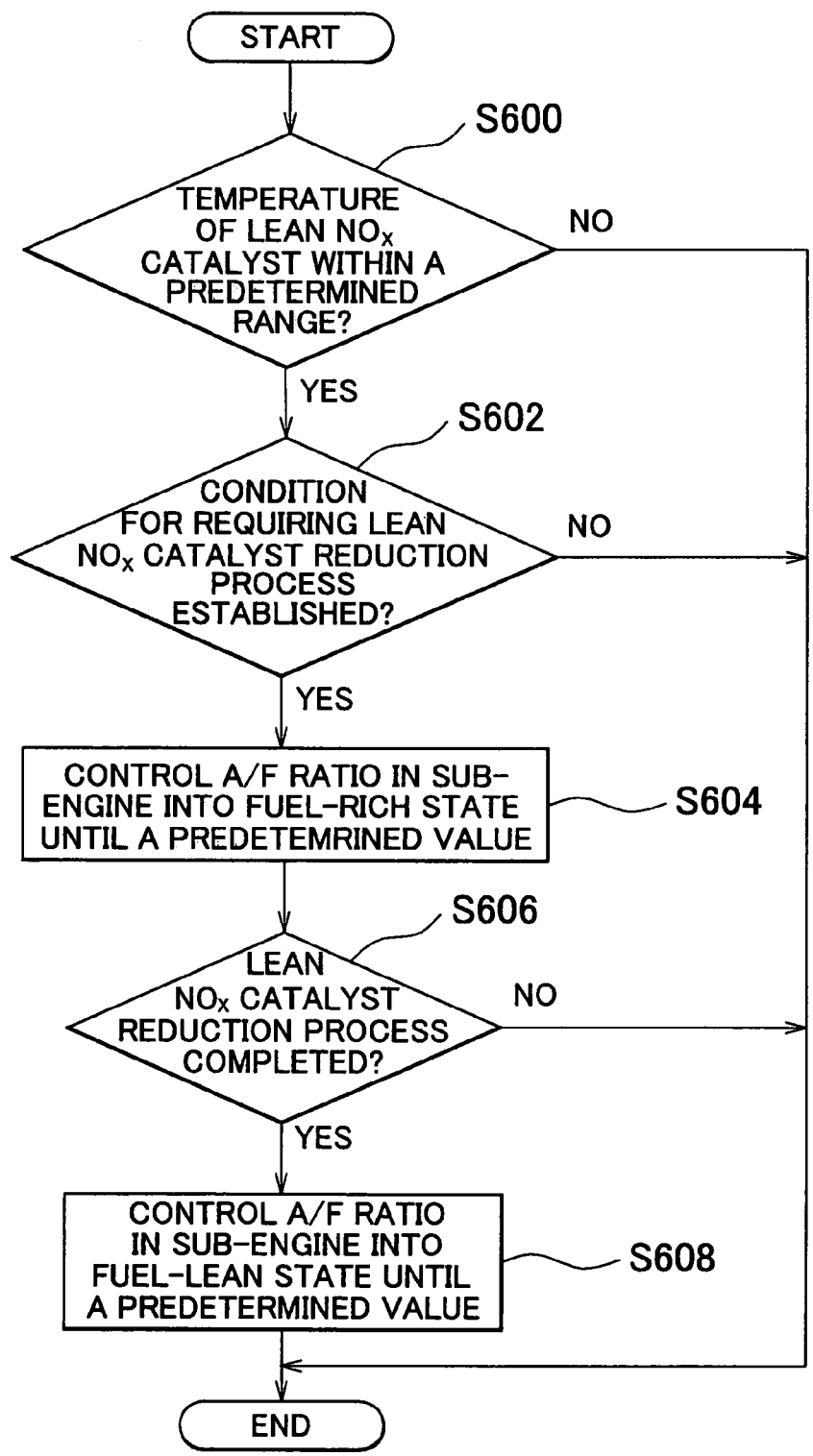
FIG. 11 is a flowchart representing a process for reducing a lean $NO_X$ catalyst in the exhaust gas emission control system according to the fourth embodiment.

The routine for reducing the exhaust catalyst (hereinafter referred to as the lean $NO_X$ catalyst) 4 executed in the exhaust emission control system 1D will be described referring to FIG. 11.

In step S600, it is determined whether the temperature of the lean $NO_X$ catalyst 4 is within a predetermined range between 250° C. and 450° C., for example. If NO is obtained in step S600, that is, it is determined that the catalytic temperature is not within the predetermined range, the routine ends. If YES is obtained in step S600, that is, the catalytic temperature is within the predetermined range, the process proceeds to step S602.

In step S602, it is determined whether the condition for the request of reducing the lean $NO_X$ catalyst 4 is established. For example, it is determined whether the total value of the fuel injection quantity is equal to or greater than a predetermined value. If NO is obtained in step S602, that is, it is determined that the condition is not established, the routine ends. If YES is obtained in step S602, that is, it is determined that the condition is established, the process proceeds to step S604.

In step S604, the air/fuel ratio of the sub-engine 6 is set to the value so as to be brought into the fuel rich state at, for example, 11.

Then in step S606, it is determined whether the process for reducing the lean $NO_X$ catalyst 4 has been completed. The determination is made based on the total value of the time period taken for operating the engine in a fuel rich state with respect to the predetermined value. If NO is obtained in step S606, that is, it is determined that the reducing process has not been completed, the routine ends. If YES is obtained in step S606, that is, it is determined that the reducing process has been completed, the process further proceeds to step S608.

In step S608, the air/fuel ratio of the sub-engine 6 is returned from the fuel rich state to the predetermined value of 14.7, for example. The routine then ends.

As aforementioned, the air/fuel ratio of the sub-engine 6 that is not related to the operation for driving the vehicle is brought into the fuel rich state so as to reduce the $NO_X$ catalyst 4. This makes it possible to reduce the exhaust emission without deteriorating the drivability.

Fifth Embodiment

Figure 12:
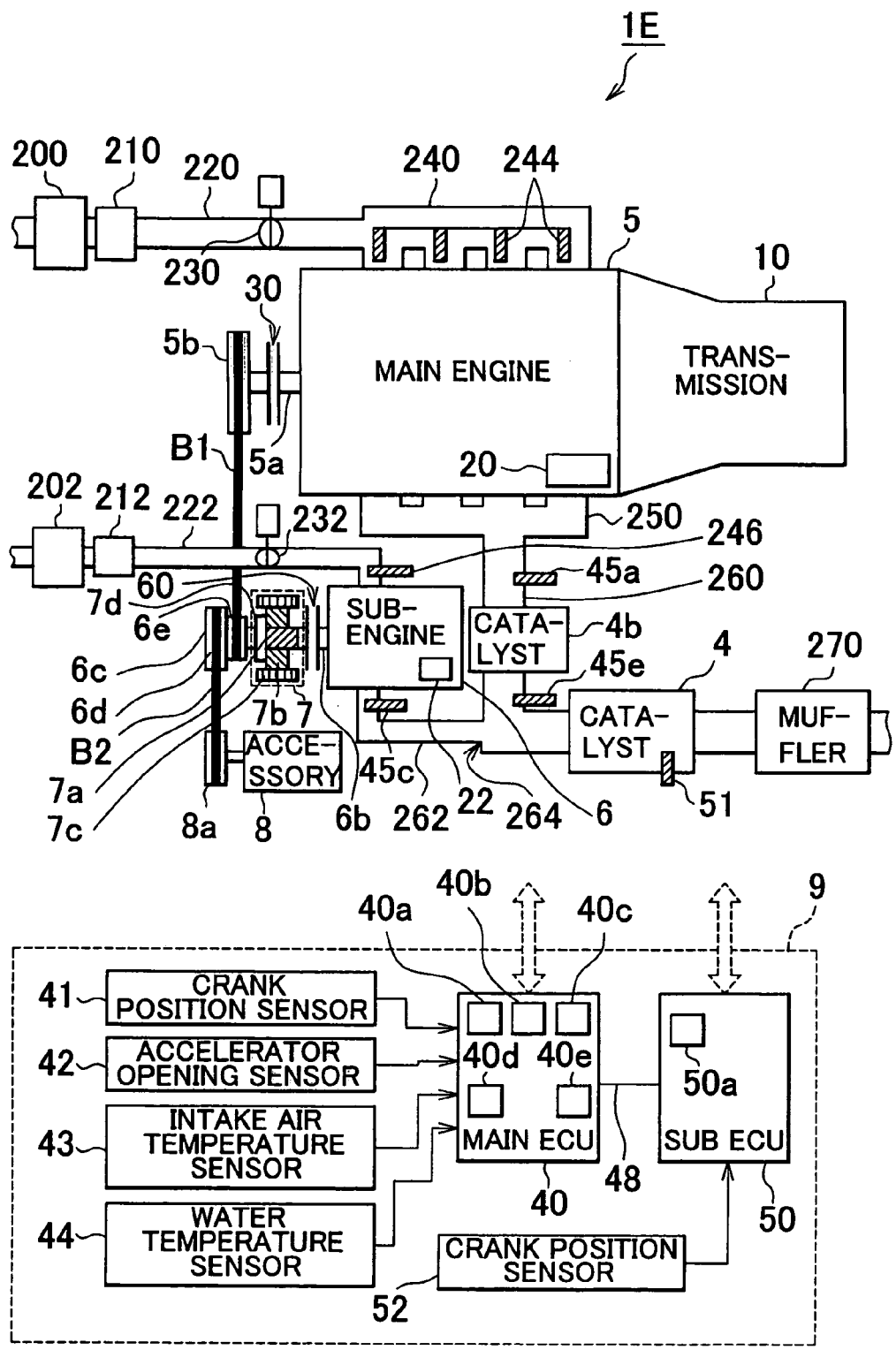
FIG. 12 is a schematic view showing a whole structure of an exhaust emission control system according to a fifth embodiment.

A structure of an exhaust emission control system 1E according to a fifth embodiment will be described referring to FIG. 12. In FIG. 12, the same elements as those of the exhaust emission control system 1B according to the second embodiment will be designated with the same reference numerals.

This embodiment is the same as the second embodiment except that an exhaust catalyst for the main engine (main engine exhaust emission purifying device) 4b and a main engine $O_2$ sensor for the main engine 45e (main engine air/fuel ratio detection unit) are provided upstream of the junction portion 264, that is, between the main engine 5 and the junction portion 264. In this embodiment, the $O_2$ sensor 45b as shown in the second embodiment is not provided downstream of the exhaust catalyst 4.

In the aforementioned case, the exhaust gas discharged from the main engine 5 is purified in the exhaust catalyst 4b. The air/fuel ratio of the air/fuel mixture in the main engine 5 is controlled based on the air/fuel ratio of the exhaust gas detected by the $O_2$ sensor 45a and the main engine $O_2$ sensor 45e.

Figure 13:
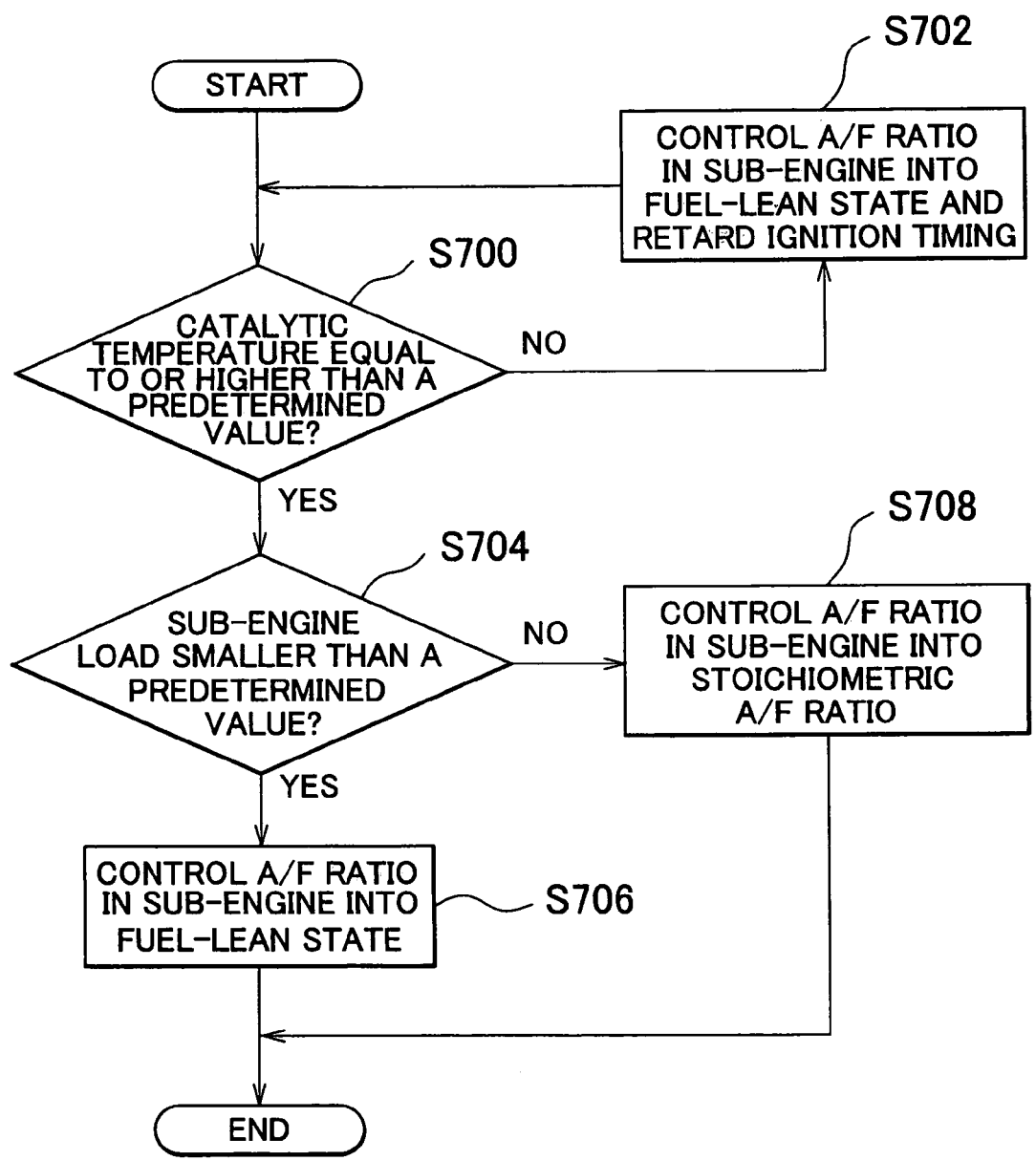
FIG. 13 is a flowchart representing an air/fuel ratio control for a secondary engine executed in the exhaust emission control system according to the fifth embodiment.

The control routine of the air/fuel ratio of the sub-engine 6 executed in the exhaust emission control system 1E will be described referring to the flowchart of FIG. 13.

In step S700, it is determined whether the temperature of the exhaust catalyst 4 is equal to or higher than a predetermined temperature. If YES is obtained in step S700, that is, it is determined that the catalytic temperature is equal to or higher than the predetermined temperature, the process proceeds to step S704.

If NO is obtained in step S700, that is, it is determined that the catalytic temperature is lower than the predetermined temperature, the process proceeds to step S702. In step S702, the air/fuel ratio in the sub-engine 6 is controlled into the fuel lean state, and the ignition timing is retarded. This may allow the sub-engine 6 to increase the temperature of the exhaust catalyst 4 under the heat of the exhaust gas discharged therefrom. The air/fuel ratio control into the fuel lean state and retard of the ignition timing are continued until the temperature of the exhaust catalyst 4 is increased to reach the predetermined temperature or higher. The temperature of the exhaust catalyst 4 may be increased by increasing quantity of the intake air into the sub-engine 6 so as to increase the flow rate of the exhaust gas discharged therefrom.

If YES is obtained in step S700, that is, it is determined that the catalytic temperature exceeds the predetermined temperature, the process proceeds to step S704. In step S704, it is determined whether an engine load of the sub-engine 6 is lower than a predetermined value. If YES is obtained in step S704, that is, it is determined that the engine load is lower than the predetermined value, the process proceeds to step S706 where the air/fuel ratio in the sub-engine 6 is controlled into the fuel lean state. Meanwhile if NO is obtained in step S704, that is, it is determined that the engine load of the sub-engine 6 is equal to or higher than the predetermined value, the process proceeds to step S708 where the air/fuel ratio in the sub-engine 6 is controlled into the theoretical or stoichiometric air/fuel ratio.

As aforementioned, the sub-engine 6 is operated in the fuel lean state at the low load. This makes it possible to improve the specific fuel consumption of the sub-engine 6.

In this embodiment, as the $O_2$ sensor 45a and the main engine $O_2$ sensor 45e are provided upstream of the junction portion 264, the air/fuel ratio of the exhaust gas discharged from the main engine 5 can be detected under no influence of the exhaust gas discharged from the sub-engine 6. Even if the sub-engine 6 is operated at the air/fuel ratio (fuel lean state, for example) which is different from the one at which the main engine 5 is operated, the air/fuel ratio in the main engine 5 can be independently detected. This makes it possible to accurately control the air/fuel ratio in the main engine 5 independently.

According to this embodiment, the exhaust gas discharged from the main engine 5 can be purified by the main engine exhaust catalyst 4b, which is provided upstream of the junction portion 264. Accordingly the flow rate of the exhaust gas to be purified by the exhaust catalyst 4 downstream of the junction portion 264 can be reduced. This may reduce the size of the exhaust catalyst 4.

Sixth Embodiment

Figure 14:
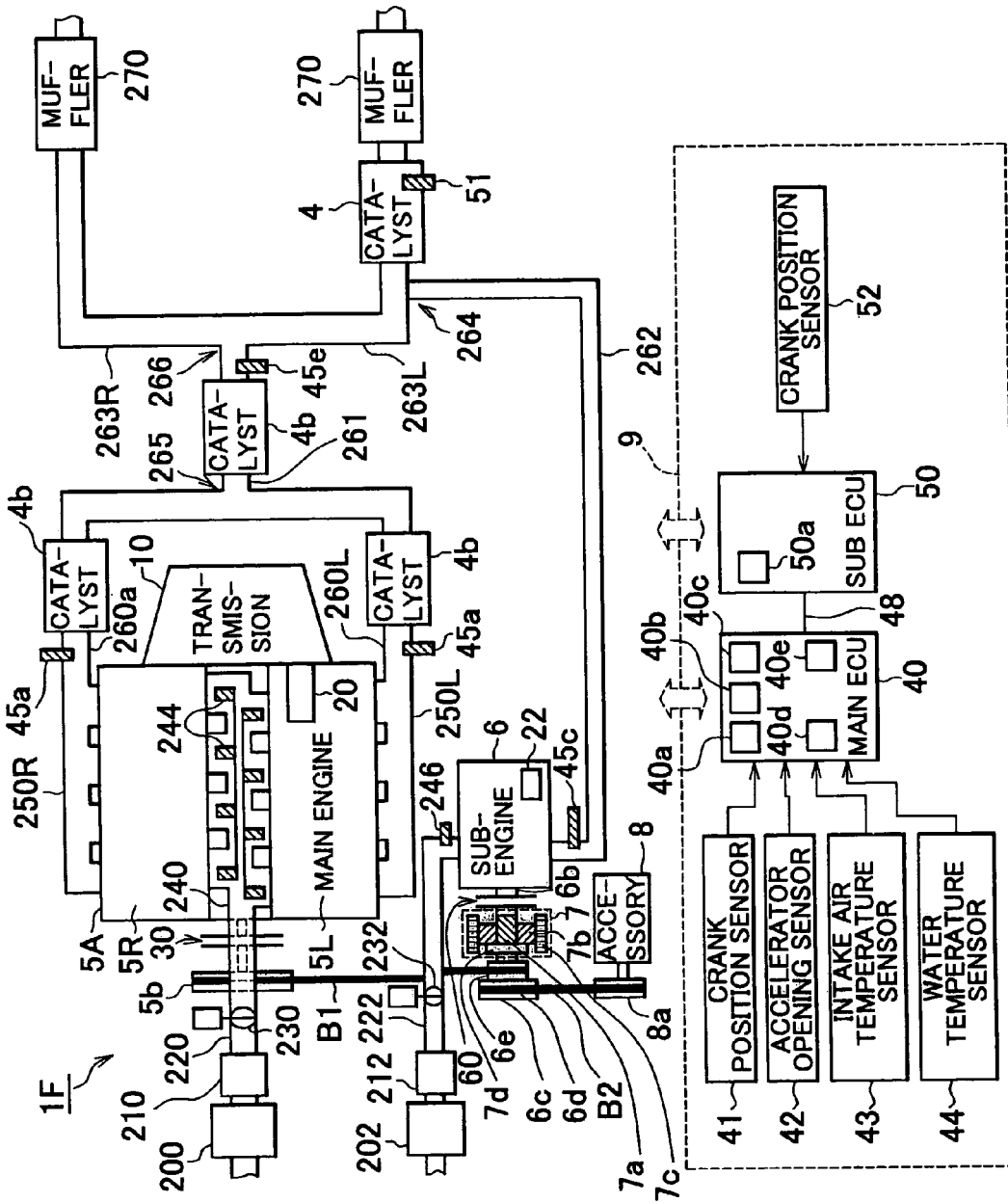
FIG. 14 is a schematic view showing a whole structure of an exhaust emission control system according to a sixth embodiment.

A structure of an exhaust emission control system 1F according to a sixth embodiment will be described referring to FIG. 14. In FIG. 14, the same elements as those of the exhaust emission control system 1E according to the fifth embodiment will be designated with the same reference numerals.

A main engine 5A of this embodiment is formed as a V-type engine including an exhaust manifolds 250R and 250L provided with its right bank 5R and the left bank 5L, respectively. The exhaust manifolds 250R and 250L are connected with exhaust pipes 260R and 260L, respectively. The exhaust pipes 260R and 260L join together at a joint portion 265. The joined exhaust pipe 261 is further branched into exhaust pipes 263R and 263L at a branch portion 266 downstream of the joint portion 265.

The exhaust pipe 260R is provided with the main engine exhaust catalyst (main engine exhaust gas purifying unit) 4b. The $O_2$ sensor 45a is provided upstream of the main engine exhaust catalyst 4b. The exhaust pipe 260L is provided with the main engine exhaust catalyst 4b, upstream of which is provided with the $O_2$ sensor 45a.

The exhaust pipe 261 includes the main engine exhaust catalyst 4b. The main engine $O_2$ sensor 45e is provided downstream of the main engine exhaust catalyst 4b.

The exhaust gas discharged from the main engine 5A is purified by the main engine exhaust catalysts 4b provided in the exhaust pipes 206R, 260L, and 261, respectively. The air/fuel ratio of the right bank 5R is controlled based on the air/fuel ratio of the exhaust gas to be detected by the $O_2$ sensor 45a and the main engine $O_2$ sensor 45e both provided in the exhaust pipe 260R. The air/fuel ratio of the left bank 5L is controlled based on the air/fuel ratio of the exhaust gas to be detected by the $O_2$ sensor 45a and the main engine $O_2$ sensor 45e both provided in the exhaust pipe 260L.

The exhaust pipe 262 provided in the sub-engine 6 is connected with the exhaust pipe 263L of the main engine 5A at the joint portion 264. The exhaust gas discharged from the sub-engine 6 to the exhaust pipe 262 is merged with a part of the exhaust gas from the main engine 5A at the junction portion 264. The exhaust gas is then purified by the exhaust catalyst 4 downstream of the junction portion. Other features or characteristics are the same as those described in the fifth embodiment, and the description will be omitted.

In this embodiment, the exhaust gas discharged from the main engine 5A is branched at the branch portion 266 into the exhaust pipes 263R and 263L. Accordingly the flow rate of the exhaust gas flowing from the main engine 5A into the exhaust catalyst 4 is reduced. This may prevent the exhaust gas at a low temperature discharged from the main engine 5A from decreasing the temperature of the exhaust catalyst 4, avoiding decrease in the ratio of purifying the exhaust gas discharged from the sub-engine 6.

Although various embodiments of the invention have been described, it is to be understood that the invention is not limited to the aforementioned embodiments and can be modified into various forms without departing from the sprit of the invention. For example, the number of the $O_2$ sensors or arrangement thereof is not limited to the aforementioned embodiments.

According to the invention, the exhaust emission control system includes an exhaust passage having a junction portion at which each exhaust gas discharged from the main engine and the sub-engine join together, and an exhaust emission purifying unit that purifies the exhaust gas joined at the junction portion provided in the exhaust passage. The aforementioned structure allows the harmful component of the exhaust gas discharged from the sub-engine to be removed, thus restraining deterioration in the exhaust emission.

What is claimed is:

1. An exhaust emission control system for a vehicle including a primary engine and a secondary engine having a displacement smaller than that of the primary engine, the exhaust emission control system comprising:

an exhaust passage having a junction portion at which exhaust gas discharged from the primary engine and exhaust gas discharged from the secondary engine join together;

an exhaust emission purifying device that purifies the exhaust gas joined at the junction portion in the exhaust passage;

a first air/fuel ratio detection unit provided between the primary engine and the junction portion for detecting an air/fuel ratio of exhaust gas;

a second air/fuel ratio detection unit provided downstream of the exhaust emission purifying device for detecting an air/fuel ratio of the exhaust gas; and a controller that controls an air/fuel ratio of air/fuel mixture each admitted into the primary engine and the secondary engine based on the air/fuel ratio detected by the first air/fuel ratio detection unit and the air/fuel ratio detected by the secon air/fuel ratio detection unit, respectively, wherein:

an activated state of the exhaust emission purifying device is determined; and when it is determined that the exhaust emission purifying device is not in the activated state, the secondary engine is started.

2. An exhaust emission control system for a vehicle including a primary engine and a secondary engine having a displacement smaller than that of the primary engine, the exhaust emission control system comprising:

an exhaust emission purifying device that purifies exhaust gas discharged from the secondary engine, the exhaust emission purifying device being warmed under heat of exhaust gas discharged from the primary engine;

a first air/fuel ratio detection unit provided between the primary engine and a junction portion, at which the exhaust gas discharged from the primary engine and the exhaust gas discharged from the secondary engine join together, for detecting an air/fuel ratio of exhaust gas;

a second air/fuel ratio detection unit provided downstream of the exhaust emission purifying device for detecting an air/fuel ratio of the exhaust gas; and a controller that controls an air/fuel ratio of air/fuel mixture each admitted into the primary engine and the secondary engine based on the air/fuel ratio detected by the first air/fuel ratio detection unit and the air/fuel ratio detected by the second air/fuel ratio detection unit, respectively, wherein:

an activated state of the exhaust emission purifying device is determined; and when it is determined that the exhaust emission purifying device is not in the activated state, the secondary engine is started.

3. An exhaust emission control system for a vehicle including a primary engine and a secondary engine having a displacement smaller than that of the primary engine, the exhaust emission control system comprising:

an exhaust passage having a junction portion at which exhaust gas discharged from the primary engine and exhaust gas discharged from the secondary engine join together;

an exhaust emission purifying device that purifies the exhaust gas joined at the junction portion in the exhaust passage;

a first air/fuel ratio detection unit provided between the primary engine and the junction portion for detecting an air/fuel ratio of exhaust gas;

a second air/fuel ratio detection unit provided downstream of the exhaust emission purifying device for detecting an air/fuel ratio of the exhaust gas;

a controller that controls an air/fuel ratio of air/fuel mixture each admitted into the primary engine and the secondary engine based on the air/fuel ratio detected by the first air/fuel ratio detection unit and the air/fuel ratio detected by the second air/fuel ratio detection unit, respectively; and a temperature detection unit that detects a temperature of a catalyst of the exhaust emission purifying device, wherein the secondary engine is stopped when the detected temperature of the catalyst is equal to or higher than a predetermined value.

4. An exhaust emission control system for a vehicle including a primary engine and a secondary engine having a displacement smaller than that of the primary engine, the exhaust emission control system comprising:

an exhaust emission purifying device that purifies exhaust gas discharged from the secondary engine, the exhaust emission purifying device being warmed under heat of exhaust gas discharged from the primary engine;

a first air/fuel ratio detection unit provided between the primary engine and a junction portion, at which the exhaust gas discharged from the primary engine and the exhaust gas discharged from the secondary engine join together, for detecting an air/fuel ratio of exhaust gas;

a second air/fuel ratio detection unit provided downstream of the exhaust emission purifying device for detecting an air/fuel ratio of the exhaust gas;

a controller that controls an air/fuel ratio of air/fuel mixture each admitted into the primary engine and the secondary engine based on the air/fuel ratio detected by the first air/fuel ratio detection unit and the air/fuel ratio detected by the second air/fuel ratio detection unit, respectively; and a temperature detection unit that detects a temperature of a catalyst of the exhaust emission purifying device, wherein the secondary engine is stopped when the detected temperature of the catalyst is equal to or higher than a predetermined value.

5. An exhaust emission control system for a vehicle including a primary engine and a secondary engine having a displacement smaller than that of the primary engine, the exhaust emission control system comprising:

an exhaust passage having a junction portion at which exhaust gas discharged from the primary engine and exhaust gas discharged from the secondary engine join together;

an exhaust emission purifying device that purifies the exhaust gas joined at the junction portion in the exhaust passage;

a first air/fuel ratio detection unit provided between the primary engine and the junction portion for detecting an air/fuel ration of exhaust gas;

a second air/fuel ratio detection unit provided downstream of the exhaust emission purifying device for detecting an air/fuel ratio of the exhaust gas; and a controller that controls an air/fuel ratio of air/fuel mixture each admitted into the primary engine and the secondary engine based on the air/fuel ratio detected by the first air/fuel ratio detection unit and the air/fuel ratio detected by the second air/fuel ratio detection unit, respecticely, wherein:

the exhaust emission purifying device comprises an $NO_X$ absorbing type catalyst; and an air/fuel ratio of air/fuel misxture admitted into the secondary engine is controlled into a rich state with respect to a theoretical air/fuel ratio when quantity of $NO_X$ absorbed in the $NO_X$ absorbing type catalyst becomes equal to or larger than a predetermined value.

6. An exhaust emission control system for a vehicle including a primary engine and a secondary engine having a displacement smaller than that of the primary engine, the exhaust emission control system comprising:

an exhaust emission purifying device that purifies ezhaust gas discharged from the secondary engine, the exhaust emission purifying device being warmed under heat of exhaust gas discharged from the primary engine;

a first air/fuel ration detection unit provided between the primary engine and a junction portion, at which the exhaust gas discharged from the primary engine and the exhaust gas discharged form the secondary engine join together, for detecting an air/fuel ratio of exhaust gas;

a second air/fuel ration detection unit provided downstream of the exhaust emission purifying device for detecting an air/fuel ratio of the exhaust gas;

a controller that controls an air/fuel ratio of air/fuel mixture each admitted into the primary engine and the secondary engine based on the air/fuel ratio detected by the first air/fuel ratio detection unit and the air/fuel ratio detected by the second air/fuel ratio detection unit, respectively, wherein:

the exhaust emission purifying device comprises an $NO_X$ absorbing type catalyst; and an air/fuel ratio of air/fuel mixture admitted into the secondary engine is controlled into a rich state with respect ot a theoretical air/fuel ratio when quantity of $NO_X$ absorbed in the $NO_X$ absorbing type catalyst becomes equal to or larger than a predetermined value.

* * * * *